US007881946B1

(12) United States Patent
Yehuda et al.

(10) Patent No.: US 7,881,946 B1
(45) Date of Patent: Feb. 1, 2011

(54) METHODS AND APPARATUS FOR GUIDING A USER THROUGH A SAN MANAGEMENT PROCESS

(75) Inventors: Hanna Yehuda, Newton, MA (US); Morrie Gasser, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1801 days.

(21) Appl. No.: 11/021,107

(22) Filed: Dec. 23, 2004

(51) Int. Cl.
*G06Q 99/00* (2006.01)
(52) U.S. Cl. .................................... 705/1.1
(58) Field of Classification Search ............. 705/1, 705/1.1
See application file for complete search history.

(56) References Cited

U.S. PATENT DOCUMENTS

| 7,194,538 | B1* | 3/2007 | Rabe et al. ............... 709/224 |
| 7,275,098 | B1* | 9/2007 | Becher et al. ............ 709/223 |
| 2002/0019908 | A1* | 2/2002 | Reuter et al. ............ 711/112 |
| 2002/0143942 | A1* | 10/2002 | Li et al. ................... 709/225 |
| 2003/0154271 | A1* | 8/2003 | Baldwin et al. .......... 709/223 |
| 2004/0085347 | A1* | 5/2004 | Hagarty et al. ........... 345/735 |
| 2005/0108375 | A1* | 5/2005 | Hallak-Stamler ........ 709/223 |

OTHER PUBLICATIONS

EMC ControlCenter Automated Resource Manager Data Sheet, 2002.*

* cited by examiner

*Primary Examiner*—Jonathan Ouellette
(74) *Attorney, Agent, or Firm*—Krishnendu Gupta; Gerald P. Kazanjian

(57) ABSTRACT

In response to a user selection of a management function to configure a storage area network, a resource manager application generates a graphical user interface that displays a list including at least initial process steps requiring selection of resources in the storage area network to execute the management function. Based on input from a user such as selection of resources for a given process step in the list, the resource manager application dynamically selects further process steps in addition to the list of initial process steps for display in the list. In this way, a user can i) view a changing list of process steps and ii) identify which additional process steps are required to perform a respective management function as a result of making a selection of storage area network resources for the given process step.

38 Claims, 22 Drawing Sheets

METHODS AND APPARATUS FOR GUIDING A USER THROUGH A SAN MANAGEMENT PROCESS

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Data storage system developers have responded to the increased need for storage by integrating high capacity data storage systems, data communications devices (e.g., switches), and computer systems (e.g., host computers or servers) into networks called "storage networks" or "Storage Area Networks" (SANs.)

In general, a storage area network is a collection of data storage systems that are networked via a switching fabric to a number of host computer systems operating as servers. The host computers access data stored in the data storage systems on behalf of client computers that request data from the data storage systems. For example, according to conventional applications, upon receiving a storage access request, a respective host computer accesses a large repository of storage through the switching fabric on behalf of the requesting client. Thus, a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional network management storage application generates a graphical user interface utilized by a network manager to graphically select, interact with, and manage local or remote devices and associated software processes associated with the storage area network.

Based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. In some storage area networks, a network management station and associated management software allows a network administrator or systems manager (a person responsible for managing the storage network) to allocate and deallocate resources (e.g., hardware and software resources) in a storage area network. Consequently, the network manager can reconfigure a SAN according to users' present needs.

The infrastructure required to support access to data in a storage area network can be quite complex. As an example, consider the number of hardware and software components that must work in harmony in order for a user's software application executing on a host computer system to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests.

The operating system on the host computer system then transmits the I/O requests through a host interface device resource, such as an interface card (e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array.

After the requested data is accessed via the storage devices, I/O responses are returned to the user application along an information or data flow path that includes operations and processing functionality provided by each of the aforementioned components and resources in a reverse direction back to the application on the host computer running the client application. In this way, access to data in a conventional storage area network involves reliance on a proper operation and coordination of a multitude of software and hardware resources in a storage area network.

SUMMARY

Management of a storage area network can be a challenge due to the complex network of resources in the storage area network. For example, as discussed, resources in a storage area network typically include a multitude of storage area network resources (such as those in a path between a host resource and storage array) working in harmony so that a host resource of the storage area network can access data on behalf of requesting clients. In certain cases, when even a single resource in the storage area network is not properly configured, a client may not be able to access data in the storage area network.

The description below includes several useful examples of guiding a user through a management process associated with a storage area network via use of a graphical user interface. Techniques herein simplify the management process so that a user (e.g., an inexperienced network administrator) is less likely to make mistakes during a configuration or reconfiguration of the storage area network. Preventing mistakes during configuration/reconfiguration reduces "down time" of the storage area network and time otherwise required to fix configuration errors made by a network administrator. Increased "up time" of the storage area network means that clients will be more likely able to successfully access data in the storage area network at any given time.

Accordingly, general embodiments of the present application include methods and apparatuses for guiding a user through a management process associated with a storage area network. For example, in response to a selection of a management function to configure a storage area network, a resource manager (e.g., a computer process function) generates a graphical user interface that displays a list including initial process steps to execute the selected management function. Via the graphical user interface, the resource manager receives input from the user for a given process step in the list of initial process steps. Based on the input, the resource manager dynamically selects further process steps in addition to the list of initial process steps for display in the list. The resource manager simultaneously displays the further process steps in the list to the user along with the initial process steps. The further process steps displayed in the list are also to be performed by the user in addition to the initial process steps to execute the management function. In this way, a user can view a changing list of process steps and identify which additional process steps are required to execute a respective management function as a result of performing (e.g., making a selection of storage area network resources) one or more process steps in the list.

According to further embodiments, the resource manager provides an indication in relation to entries of process steps in the list to identify a status associated with the process steps. A status associated with process steps in the list may indicate: i) that a particular process step in the list has been completed or performed already, ii) that a particular process step in the list is in progress, or iii) that a particular process step in the list has not yet been performed.

In furtherance of executing the management function, the user typically provides input data such as a selection of resources as required by a respective process step. Thus, the list of process steps associated with a corresponding selected management function may further grow as a result of receiving further input from the user.

In one application, the resource enables a user to select a process step in the list, provide input information for the selected process step via a corresponding input display screen, and thereafter view the list again. For example, during generation of a graphical user interface, the resource manager provides selectable display regions (e.g., icons) in relation to sequentially displayed process steps in the list to enable the user to select a respective uncompleted process step in the list. Upon selection of a corresponding one of the selectable display regions next to a process step in the list, the resource manager produces a display screen enabling the user to provide input to perform the respective uncompleted process step. In one application, the resource manager generates a display screen enabling the user to select resources associated with the storage area network to satisfy performing the respective uncompleted process step in the list. Additionally, the resource manager may further provide a selectable icon in the display screen that, when selected, initiates changing a view back to a previous display screen including the list of process steps associated with the management function. Accordingly, a user can toggle between viewing a list of process steps and specific display screens for providing a selection of storage area network resources associated with the corresponding process steps in the list.

Upon completion of selecting storage area network resources for a given process step, the resource manager may provide selectable display regions in relation to sequentially displayed process steps in the list to enable the user to select a respective previously performed process step in the list. Following selection (e.g., clicking on the process step) of one of the respective previously performed process steps in the list, the resource manager produces a display screen to the user illustrating a corresponding previous selection of resources in the storage area network used to satisfy the respective previously performed process step. The user is then able to modify the corresponding previous selection of storage area network resources associated with the respective previously performed process step. Accordingly, the user can complete multiple process steps in the list and thereafter go back and change a previous selection for a process step by making a new selection of resources.

According to another implementation, each of the process steps in a displayed list has a corresponding display screen generated by the resource manager for selecting storage area network resources pertinent to the process step. For example, as mentioned above, the user can select a process step and view and interact with a display screen for performing the corresponding process step chosen from the list. This involves the resource manager initially receiving a selection from the user to perform a particular process step in the list. In response to the selection to perform the particular process step, the resource manager displays a graphical user interface to the user to provide input associated with the particular process step. The resource manager then provides a selectable icon in the graphical user interface to enable the user to go directly to a next display screen associated with a corresponding next process step in the list so that the user can provide input associated with the next process step in the list without viewing the list again. In this way, a user can skip viewing the list of process steps and provide selection information for each corresponding process step via sequential interactive display screens. The resource manager may provide a user selectable option in the sequential interactive display screens so that the user can select and revert back to a viewing of the list including a sequential listing of the multiple process steps associated with management function. Also, the resource manager may provide selectable next/back options in the sequential display screens associated with process steps in the list to enable a user to traverse a series of display screens without having to view the list again.

According to yet another implementation, certain process steps in the list do not require user selections but instead depend on a background computer process to perform a process step in the list. In this instance, the resource manager enables performance of a first process step in the list via selection of storage area network resources by the user while a second process step itemized in the list is being performed via a background computer process. The resource manager provides an indication in the list of process steps so that the user is aware that a corresponding one or more of the process steps in the list is being executed by a computer task. During execution of the background computer process for the second process step, the resource manager enables the user to save selections associated with other process steps in the list in furtherance of executing the management function at a later time after completion of the background computer process.

As discussed, techniques herein are well suited for use in applications such as management of storage area networks. However, it should be noted that configurations herein are not limited to use in such applications and thus configurations herein and deviations thereof are well suited for other applications as well.

Other examples of the present application include a computer device (e.g., a host computer, workstation, etc.) configured to support the aforementioned operations disclosed herein. In such embodiments, the computer device includes a display, a memory system, a processor (e.g., a processing device) and an interconnect. The interconnect supports communications among the display, the processor and the memory system. The memory system is encoded with a resource management application that, when executed on the processor, produces a resource management process supporting the embodiments discussed above.

Yet other embodiments of the present application disclosed herein include software programs to perform the methods and operations summarized above and disclosed in detail below under the heading Detailed Description. More particularly, a computer program product (e.g., a computer-readable medium) including computer program logic encoded thereon may be executed on a computer device to support generation and display of guided management information views and associated operations as explained herein. The computer program logic, when executed on at least one processor of a corresponding computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed on a computer device to cause one or more processors in the computerized device to perform the techniques explained herein. Software processes that operate in a collection of computer devices, such as in a group of storage area network management servers, can also support embodiments of the present application.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

The description herein includes several useful examples of guiding a user through a management process associated with a storage area network via use of a graphical user interface.

For example, in response to a user selection of a management function to configure a storage area network, a resource manager application running on a network administrator's workstation generates a graphical user interface that displays a list including at least initial process steps requiring selection of resources in the storage area network to execute the management function. Based on input from a user such as selection of resources for a given process step in the list, the resource manager application dynamically selects further process steps in addition to the list of initial process steps for display in the list. In this way, a user can i) view a changing list of process steps, ii) identify which additional process steps are required to perform a respective management function as a result of making a selection of storage area network resources for the given process step, and iii) save an activity associated with execution of a management function. Thus, the graphical user interface generated by the resource manager application can be a tool for the user to learn process steps that must be performed to carry out a storage area network management function.

Figure 1:
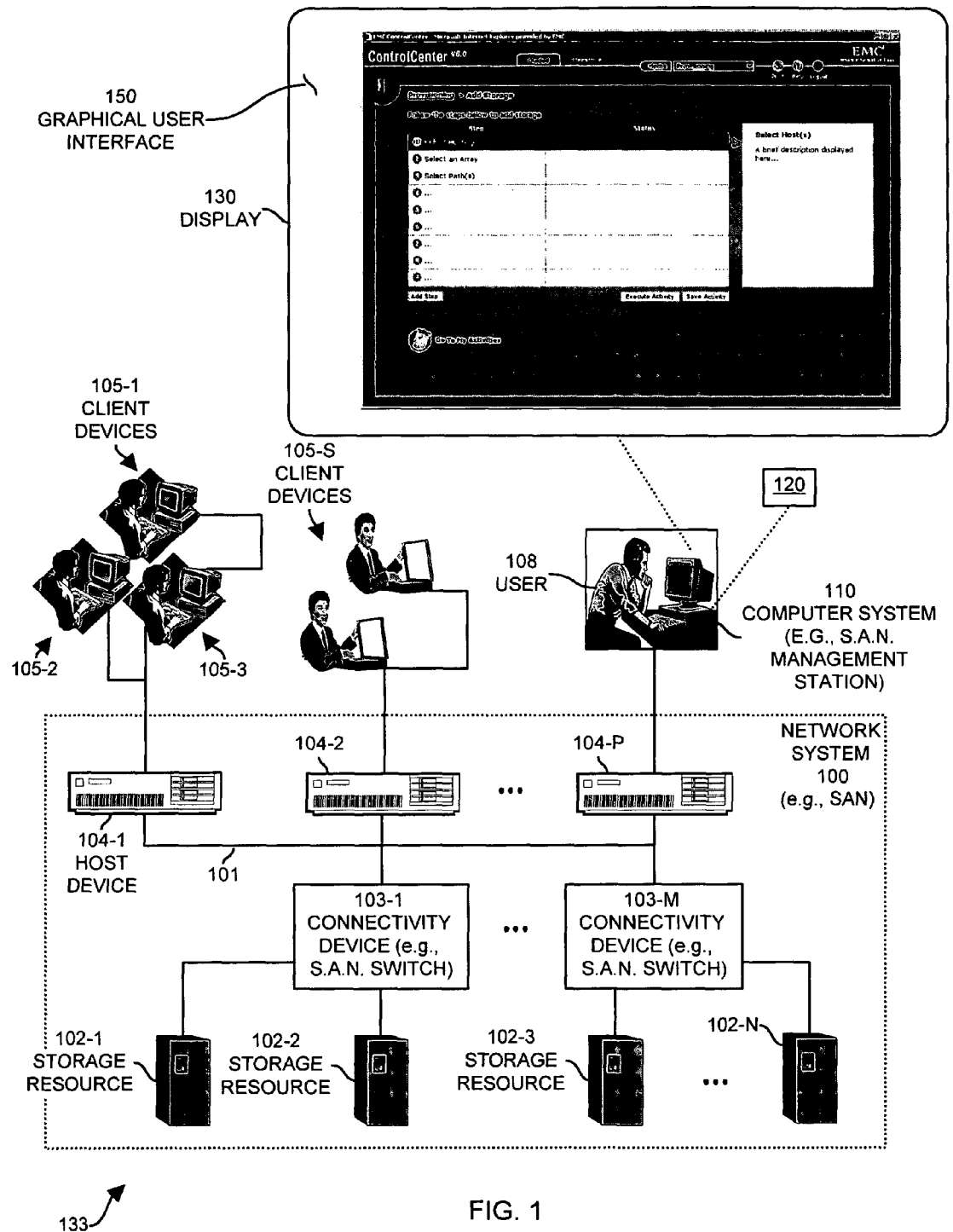
FIG. 1 is a pictorial diagram of a storage area network and corresponding management station configured to operate according to an embodiment of the present application.

FIG. 1 illustrates a storage area network environment 133 suitable for explaining an operation of example embodiments herein. As shown, network system 100 (e.g., potentially including multiple types of networks) includes a network medium 101 such as a high-speed data communications medium (e.g., Ethernet, optical network, or other type of network) that interconnects a plurality of components such as storage resources 102-1, 102-2, . . . , 102-N (collectively, storage resources 102), network switches 103-1, . . . , 103-M (collectively, network switches 103 such as SAN switches), host devices 104-1 (e.g., host servers), 104-2, . . . , 104-P (collectively, host devices 104), client devices 105-1, 105-2, . . . , 105-S (collectively, client devices 105), and computer system 110 (e.g., a storage area network management station). Computer system includes resource manager 120 such as a software application that supports generation of graphical user interface 150 on display 130.

In the example shown, computer system 110 is configured as a storage area network management station operated by network manager or user 108 (e.g., a user responsible for managing resources associated with storage area network 100). Computer system 110 executes a resource manager application 120 (e.g., a software graphical user interface application more particularly shown in FIG. 2) that generates and displays information in accordance with embodiments explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) that resource manager 120 controls to display a graphical user interface 150 as explained herein. In general, user 108 provides input commands to control what information (e.g., tables, pop-up screens, etc.) is displayed on display 130. For example, a user first makes a selection of a management function (e.g., adding storage, removing storage, replacement of a host bus adapter, adding and removing storage based on a policy, adding data access paths, managing policies, managing pools, etc.) to be applied to the storage area network environment 133. In response to the selection, computer 110 generates a graphical user interface 150 guiding the user 108 through performance of process steps to carry out the selected management function.

Figure 2:
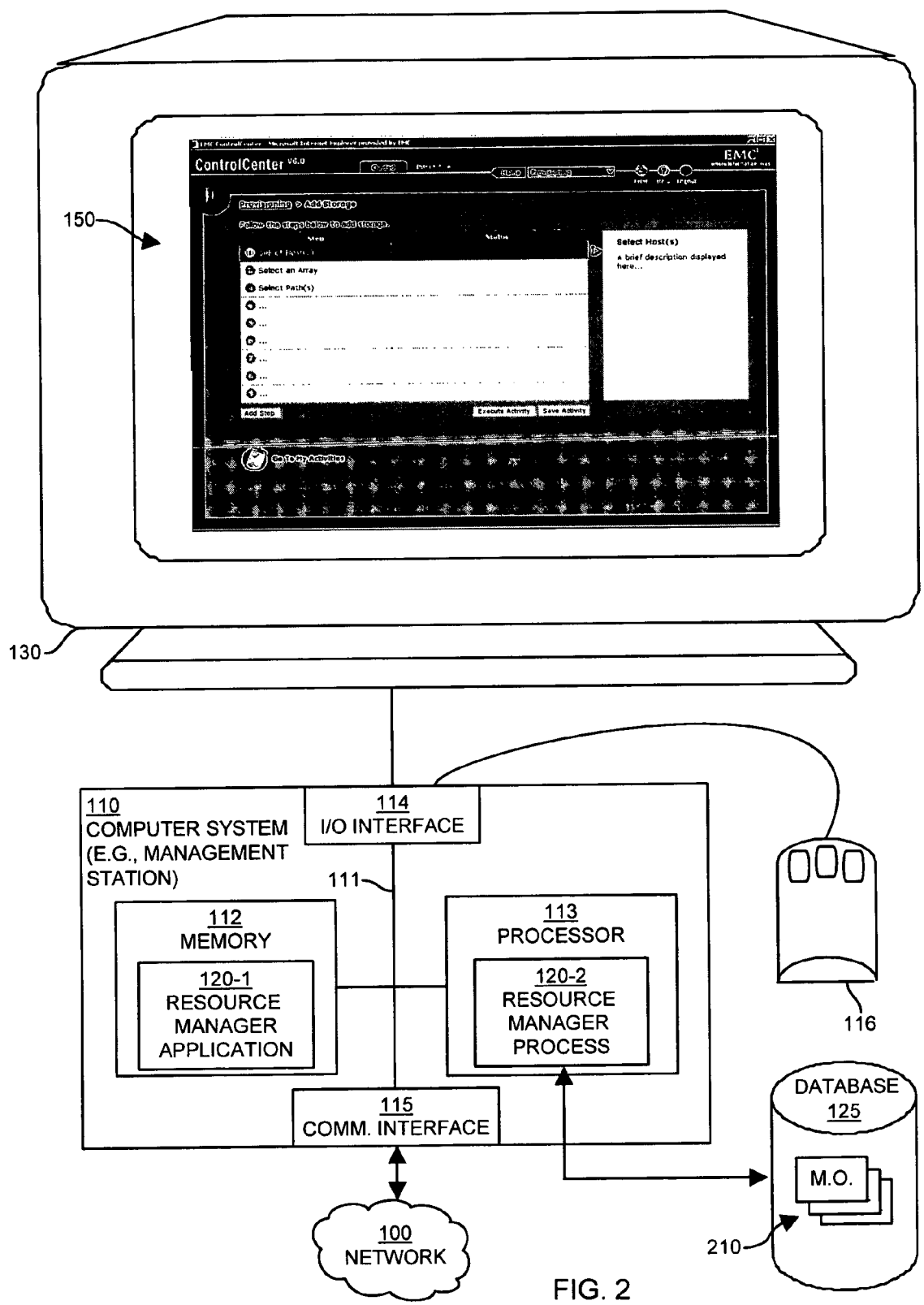
FIG. 2 is a block diagram of a sample architecture associated with the computer system management station for executing a resource manager application to generate a graphical user interface according to an embodiment of the present application.

FIG. 2 is a block diagram illustrating an example architecture of computer system 110 (e.g., a storage area network management station). Computer system 110 may be a digital processing device such as a personal computer, workstation, portable computing device, console, laptop, network terminal or the like. As shown, computer system 110 of the present example includes an interconnect 111 that couples a memory system 112, a processor 113, an input/output interface 114, and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Database 125 stores managed objects 210 associated with managed entities (e.g., hardware and software resource entities associated with host devices 104, storage resources 102, etc.) in network system 100. Communications interface 115 enables computer system 110 (and corresponding user 108) to communicate with other devices (i.e., resources) associated with network 100.

As shown, memory system 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of this discussion, general reference will be made to the resource manager 120 as performing or supporting the various steps and functional operations to carry out techniques discussed herein.

It should also be noted that example configurations herein include the resource manager application 120-1 itself (i.e., the un-executed or non-performing logic instructions and/or data). The resource manager application 120-1 may be stored on a computer readable medium (such as a floppy disk), hard disk, or optical medium. The resource manager application 120-1 may also be stored in a memory system 112 such as in firmware, read only memory (ROM), or, as in this example, as executable code in, for example, Random Access Memory (RAM). In addition to these embodiments, it should also be noted that other embodiments herein include the execution of resource manager application 120-1 in processor 113 as the resource manager process 120-2. Thus, those skilled in the art will understand that the computer system 110 may include other processes and/or software and hardware components, such as an operating system that facilitates carrying out the selected management function associated with the storage area network.

Display 130 need not be coupled directly to computer system 110. For example, the resource manager 120 can be executed on a remotely accessible computerized device. In this instance, the graphical user interface 150 may be displayed locally to the user 108, while the resource manager process 120 is executed remotely.

To display certain information in graphical user interface 150, the host computer system 110 (e.g., the resource manager process 120-2) extracts information from database 125. For example, in one embodiment, the resource manager 120 receives an identity of at least one selected network management function to be executed in the storage area network environment 133. Based on process steps associated with the selected management function, the resource manager 120 extracts and displays information associated with the managed objects 210 to guide the user 108 through process steps that are performed to execute the selected management function.

In one embodiment, computer system 110 extracts information from database 125 using SQL (Structured Query Language) and stores the information in data structures for processing. For example, database 125 contains managed objects 210 (e.g., database records, tables, data structures, etc.) associated with various hardware and software resources associated with network system 100 or storage area network environment 133 in general. More details regarding use of managed objects 210 corresponding to resources in storage area network environment 133 will be discussed in connection with FIG. 3.

Figure 3:
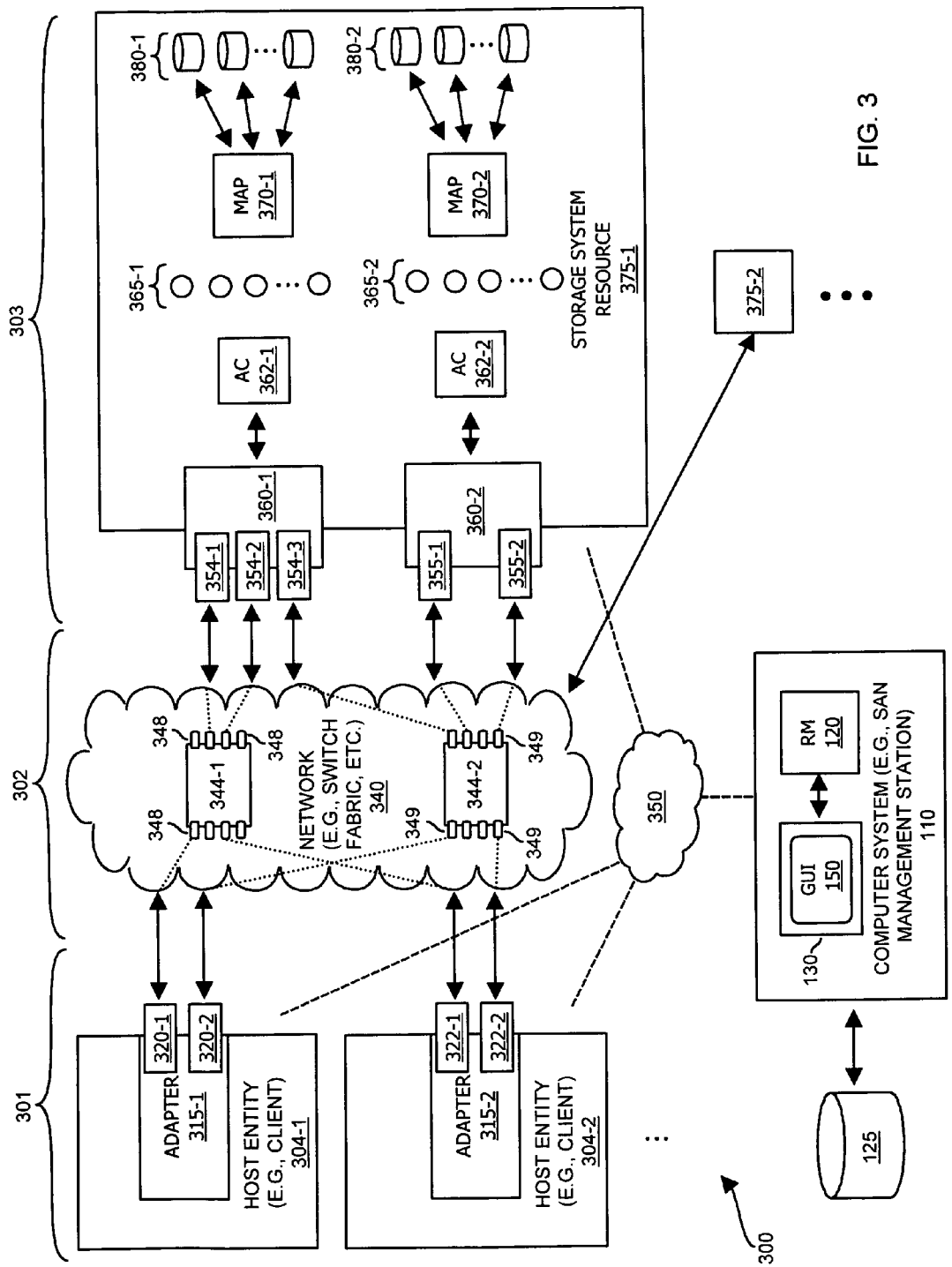
FIG. 3 is a more detailed diagram of a storage area network environment according to an embodiment of the present application.

FIG. 3 is a block diagram more particularly illustrating connectivity of example network resources (e.g., host resources 301, switch resources 302, and storage resources 303) in a storage area network environment 300. As shown, storage area network environment 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and database 125. Network 340 includes switch device 344-1, switch device 344-2, and corresponding switch ports 348 and 349. Host entity 304-1 includes adapter 315-1. Adapter 315-1 has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone set defines a group of resources in the network providing a logical path between a host resource and a storage array resource. As will be discussed in more detail, the resource manager 120 enables selection of a management function associated with the storage area network environment 300 and guides the user 108 through corresponding process steps to execute the selected management function. This is discussed in more detail in the following text and related figures.

FIGS. 4-8 are screenshots of different management views of graphical user interface 150 facilitating execution a selected management function according to embodiments of the present application.

Figure 4:
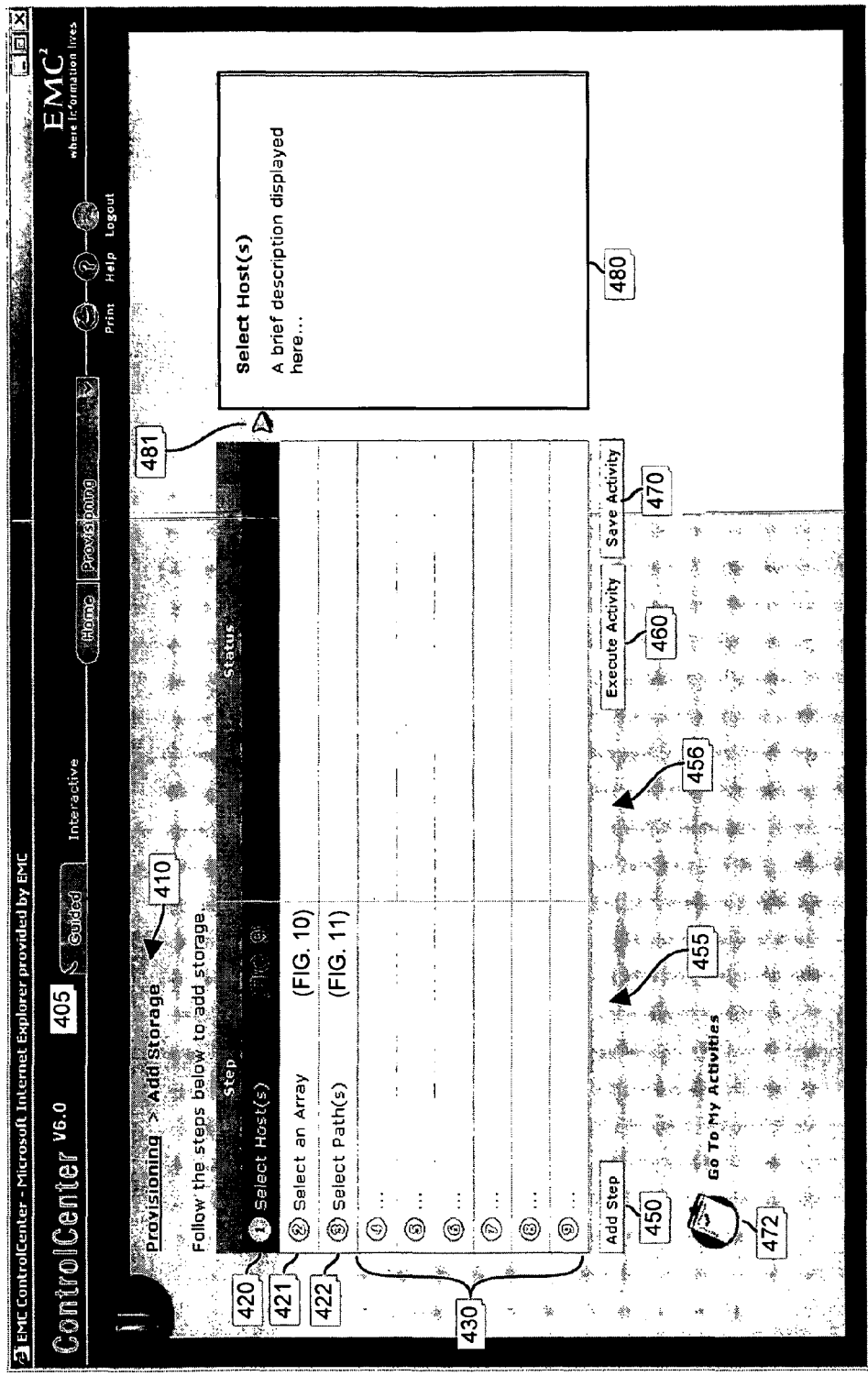
FIGS. 4-8 are respective screenshots of management views including a list of process steps according to embodiments of the present application.

For example, FIG. 4 is a screenshot 400 of graphical user interface 150 generated as a result of user 108 selecting an ADD storage management function. Icon 405 of screenshot 400 indicates that user 108 has selected a "guided" mode for carrying out the ADD storage management function. Header 410 identifies a path associated with producing screenshot 400. That is, header 410 indicates that user 108 selects "provisioning" and thereafter an "ADD storage" management function in a provisioning display screen.

Screenshot 400 includes a column 455 (e.g., labeled as "Step") of process steps 420, 421, and 422 and a column 456 (e.g., labeled as "Status") of corresponding status information. As their names suggest, the step column 455 includes a list of initial process steps (e.g., process step 420, process step 421, and process step 422) associated with the selected ADD storage management function. Resource manager 120 fills in rows 430 of column 455 with process steps at a later time depending on selection of resources associated with one or more of initial process steps 420, 421, and 422. The status column 456 provides an indication to the user 108 that none of the process steps 420-422 have been completed yet because corresponding rows in the status column 456 for the process steps 420-422 are blank. That is, there is no indication that performance of a respective process step has been completed or is currently being performed.

As shown, process step 420 (e.g., also identified as step 1) identifies that the first step associated with the add storage management function is to select a host. When selecting process step 420, resource manager 120 generates the screenshot 900 shown in FIG. 9, which guides the user 108 through the process step 420 of selecting a host resource associated with the selected ADD storage management function. Certain process steps in column 455 may need to be performed before performing other process steps.

Arrow 481 points to display region 480. Display region 480 includes text describing a corresponding function associated process step 420 so that user 108 can become familiar with each process step by reading an explanation of the corresponding process steps. Note that user 108 may move arrow 481 to another process step in column 455 to view a description associated with the other chosen process step.

Process step 421 (e.g., identified as step 2) identifies that the second step associated with the add storage management function is to select a storage array. When selecting process step 421 for performance, resource manager 120 generates the screenshot 1000 shown in FIG. 10, which guides the user 108 through the process step 421 of selecting a storage resource in the storage area network environment 133.

Process step 422 (e.g., identified as step 3) identifies that the third step associated with the add storage management function is to select a path between the previously selected host and storage array. When selecting process step 422 for performance, resource manager 120 generates the screenshot 1100 shown in FIG. 11, which guides the user 108 through the process step 421 of selecting a path in the storage area network environment 133 between the selected host and storage array resources.

Screenshot 400 also includes selectable icon 450 (e.g., selectable display region including "add step" icon) to add a process step associated with a selected management task. When user 108 clicks on icon 450, resource manager produces a pop-window enabling the user 108 to create a step to be inserted at a particular location in column 455. An example of a process step added by user 108 is a reminder to perform a documentation task associated with the management function. Other process steps added by user may require selection of yet further resources by the user 108 to complete a selected management function.

Resource manager 120 may save a template associated with a current selected management function so that the added process step automatically appears in the list every time the user selects a similar type of management function. Thus, a user 108 can customize a list of process steps that are associated with a particular type of management function.

Screenshot 400 generated by resource manager 120 also includes icon 460 and icon 470. Icon 460 (e.g., execute activity icon) enables the user 108 to execute a selected management function after all required process steps have been performed by the user 108. Icon 470 enables a user to save information associated with a selected management function. For example, a user 108 may not be able to complete all process steps for a selected management function in one sitting. In such a case, the user 108 can save his work and thereafter complete it later by selecting icon 472 that produces a listing of a user's previously stored activities. As will be discussed, certain processing tasks (e.g., tasks that take along time to perform and are performed by a background computer process) associated with a process step in the selected management function may continue offline (such as overnight) while a user 108 is not actively using computer 110.

One purpose of saving a work session of "performed" or completed process steps is to enable a junior level user to create a proposed change to storage area network environment 133 via the selection of resources for process steps associated with a selected management function. Prior to execution of the selected management function, a supervising user may review actions (e.g., via screenshots in FIGS. 9-17) associated with the respective process steps for errors to determine whether to apply or execute the selected management function.

Referring back to a process of performing process steps associated with the selected management function, after performance of either or both of process step 421 (via performing tasks specified in FIG. 10) and process step 422 (via performing tasks specified in FIG. 11), resource manager 120 updates the list of process steps in column 455 to include additional process steps depending on performance of initial process steps 420, 421 and 422.

Figure 5:
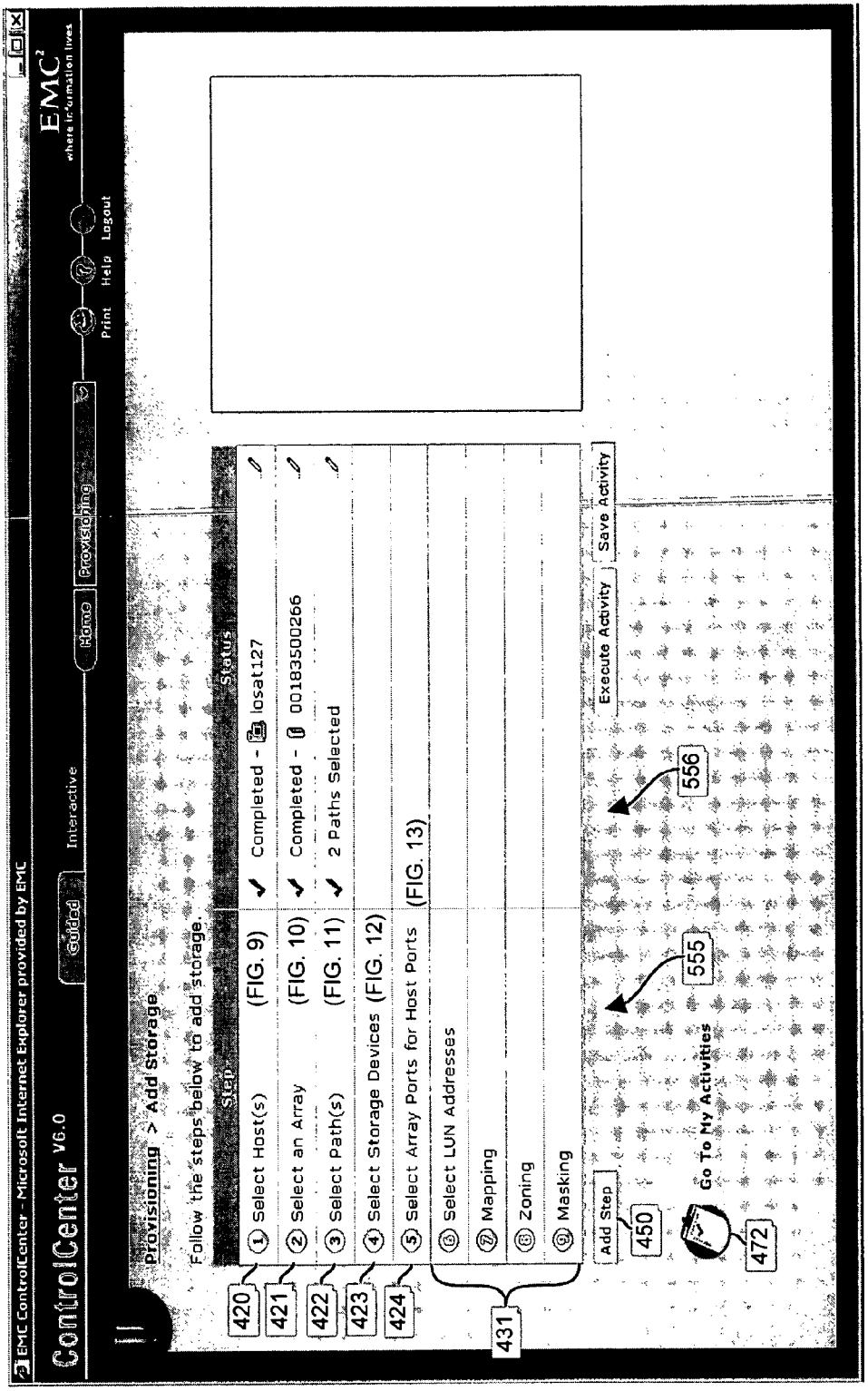

For example, in response to performing process steps 420 through 422 in screenshot 400, resource manager 120 generates screenshot 500 shown in FIG. 5 including additional process steps 423 and process step 424. Note that screenshot 500 indicates in column 556 that the first three process steps 420, 421, and 422 now have a corresponding status of being completed. Techniques of completing process steps will be more particularly discussed in connection with FIGS. 9-17.

Figure 12:
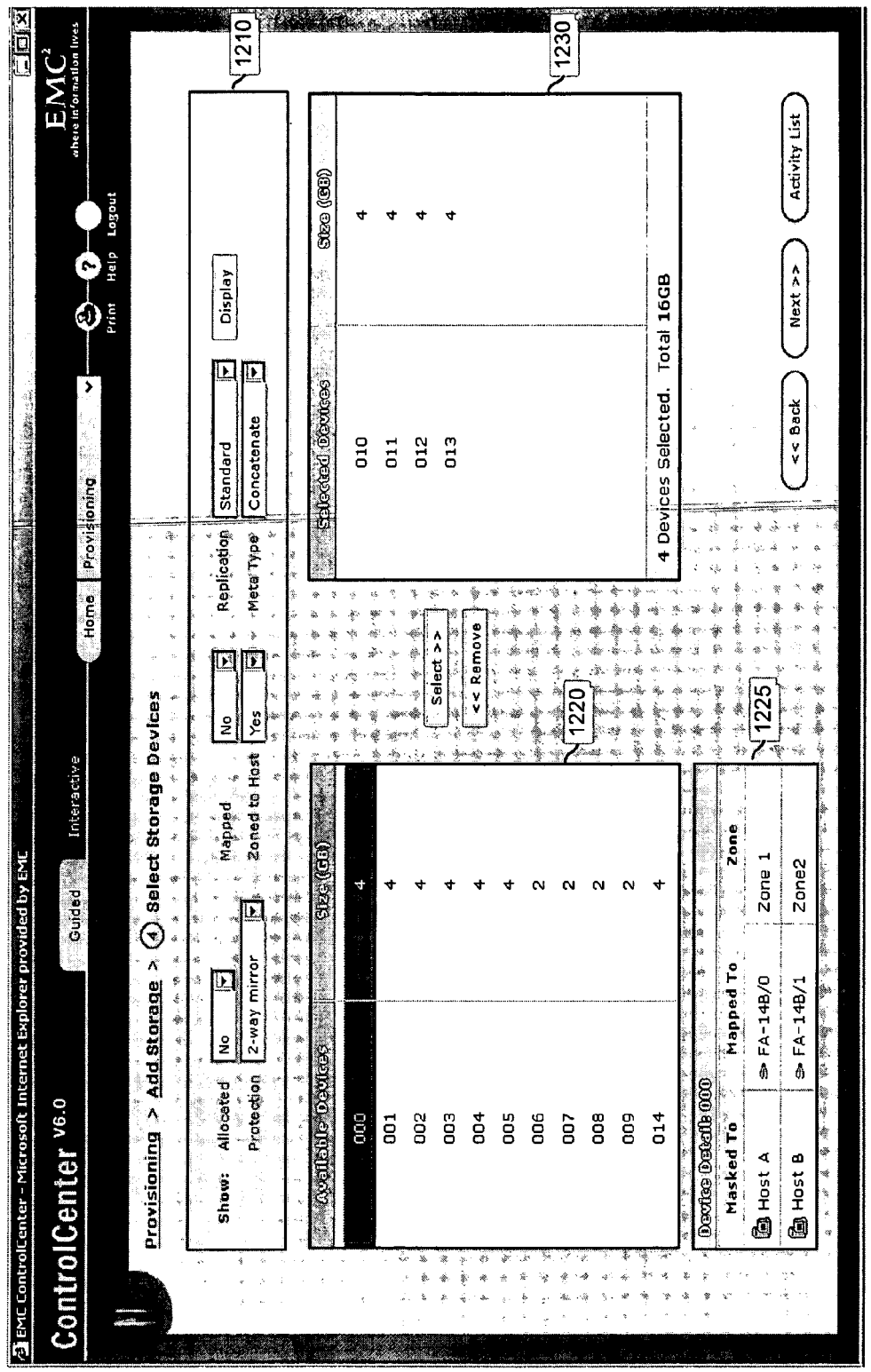
Figure 13:
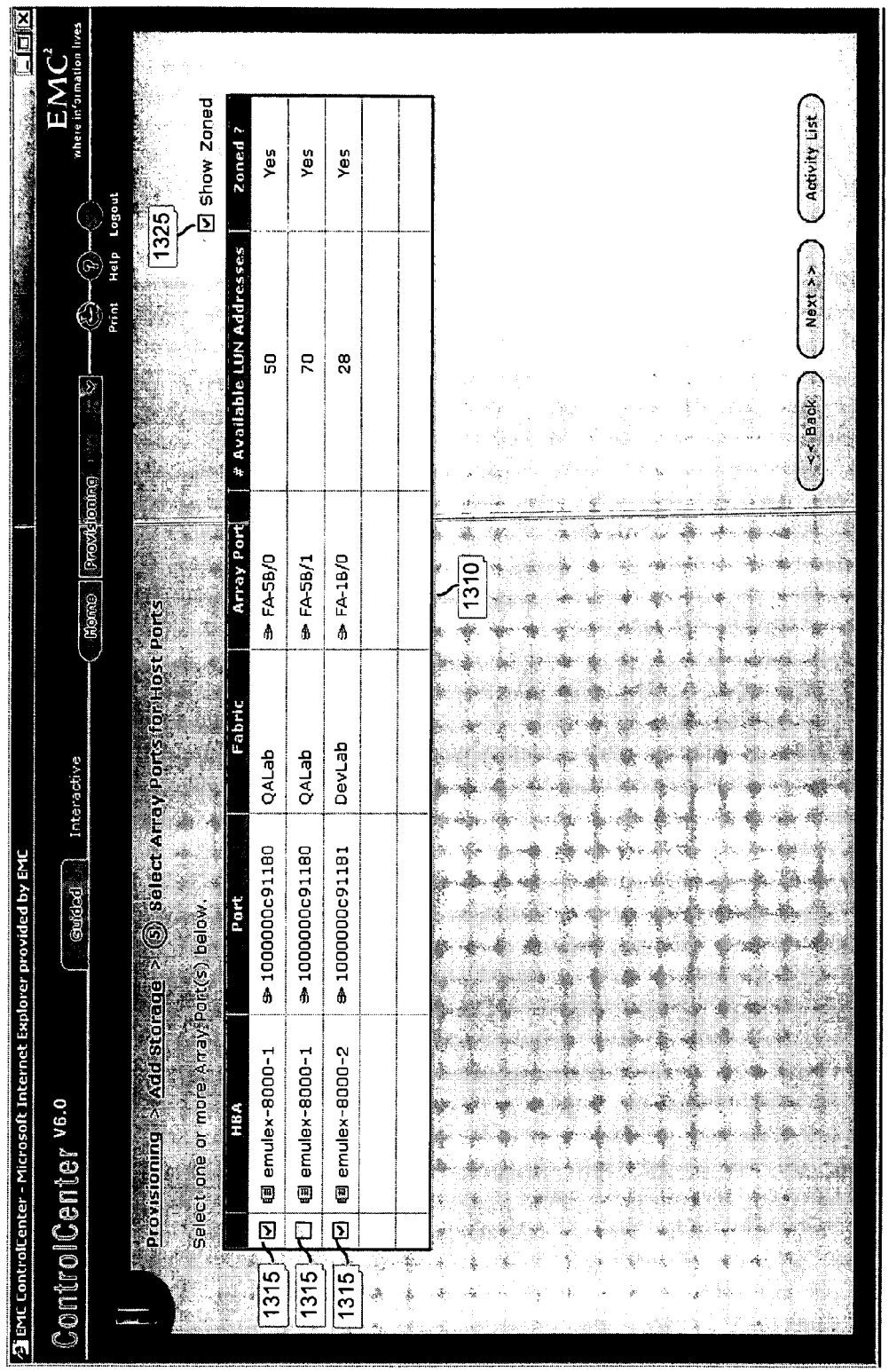

Referring again to FIG. 5, in one application, process steps 431 in column 455 cannot be performed until either of or both process steps 423 and 424 are completed by the user 108. To complete process step 423 (i.e., step 4), user clicks on process step entry "select storage devices" and proceeds to screenshot 1200 as shown in FIG. 12 where the use makes appropriate selections for the process step 423. To complete process step 424 (i.e., step 5), user clicks on process step entry "select array ports for host ports" and proceeds to screenshot 1300 as shown in FIG. 13 where the user makes appropriate selections for the process step 424.

Figure 6:
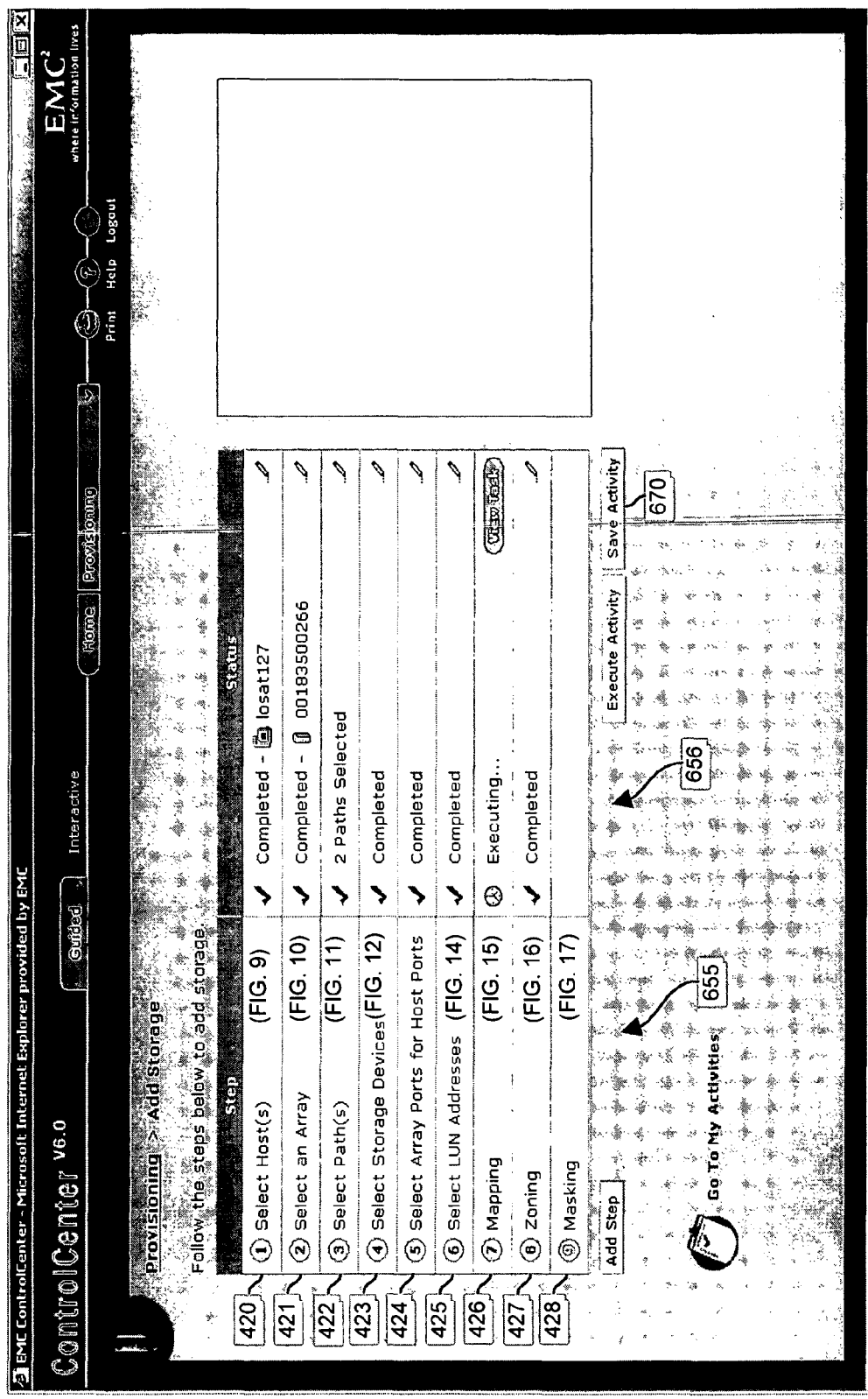

FIG. 6 is a screenshot 600 illustrating a completion of process steps 420-425 and 427 in column 655. In a similar manner as previously discussed, user 108 initiates performance of each of the process steps based on providing input. For example, for process step 425, user 108 provides input via screenshot 1400 in FIG. 14; for process step 426, user 108 provides input via screenshot 1500 in FIG. 15; for process step 427, user 108 provides input via screenshot 1600 in FIG. 16.

Note that column 656 indicates completion of process step 425 and process step 427. Additionally, column 656 indicates that process step 426 is in a process of being completed as indicated by a respective clock symbol. For process step 426, resource manager 120 executes a background computer process to perform mapping associated with resource selections by the user 108.

Figure 7:
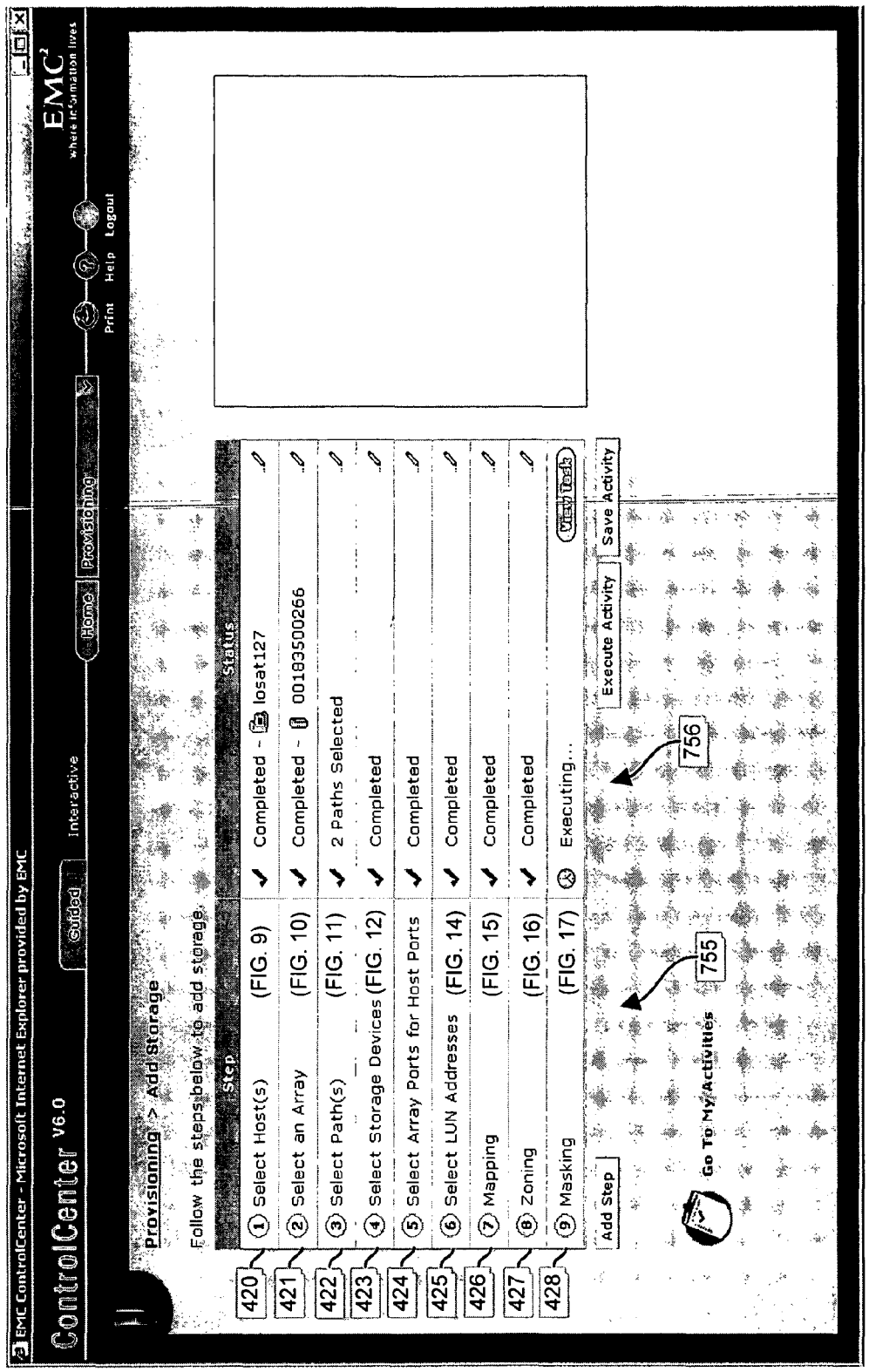

FIG. 7 is a screenshot 700 illustrating a completion of process steps 420-427 in column 755. In a similar manner as previously discussed, user 108 initiates performance of final process step 428 based on providing input via screenshot 1700 in FIG. 17. Masking may take several seconds, minutes, or hours to complete.

Figure 8:
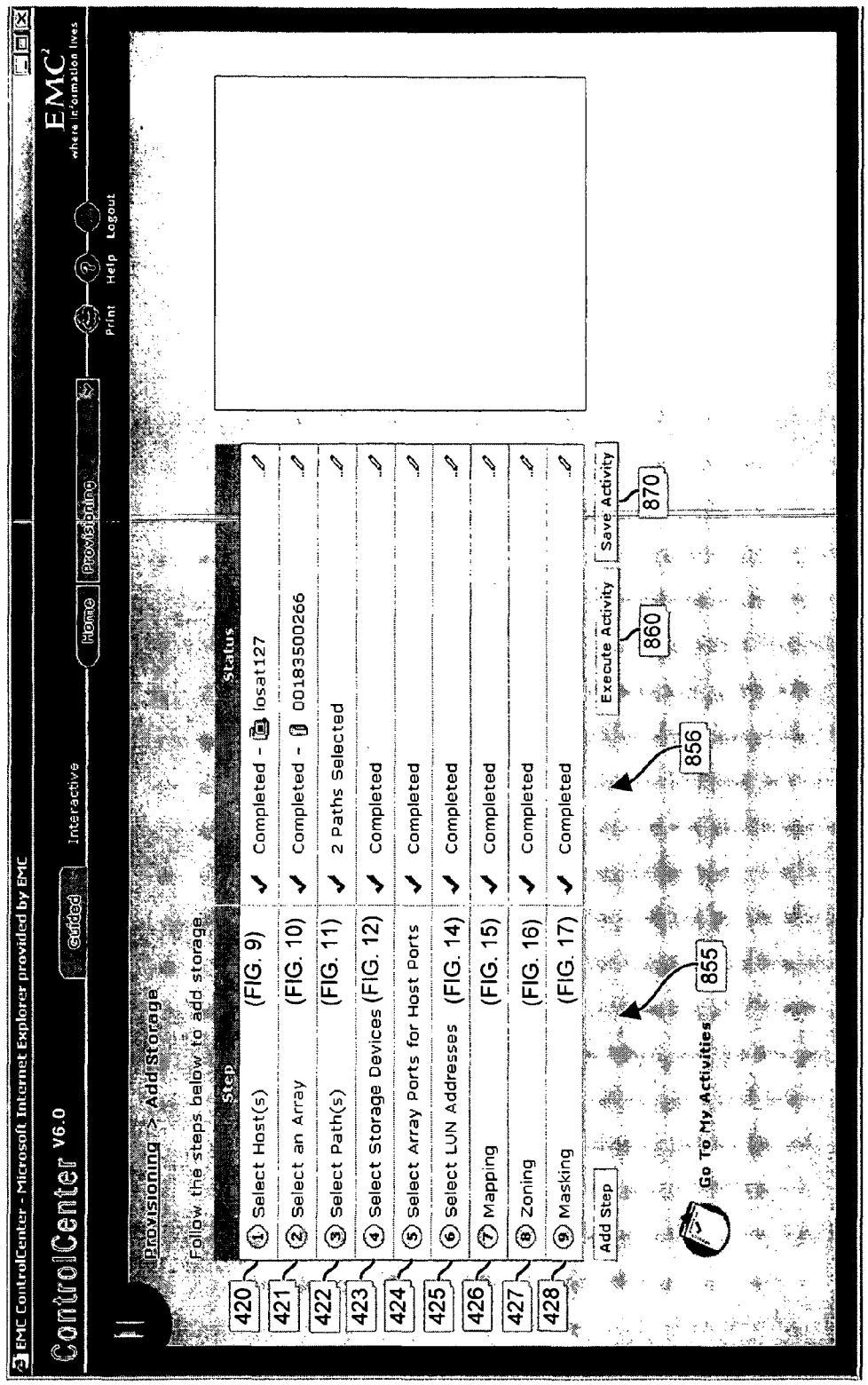

FIG. 8 is a screenshot 800 illustrating completion of all process steps 420-428 in column 855. The user 108 can execute the selected management function by clicking on icon 860 or save the work session by clicking on icon 870 for executing in the future.

Rresource manager 120 maintains a log of saved work sessions (e.g., completed process steps for the selected management function) for later execution as well work sessions corresponding to selected management functions executed by the user 108. Thus, user 108 may refer to the log of work sessions at a later time for troubleshooting storage area network configurations.

As discussed, FIGS. 9-17 are respective screenshots of management views associated with respective process steps according to embodiments of the present application.

Figure 9:
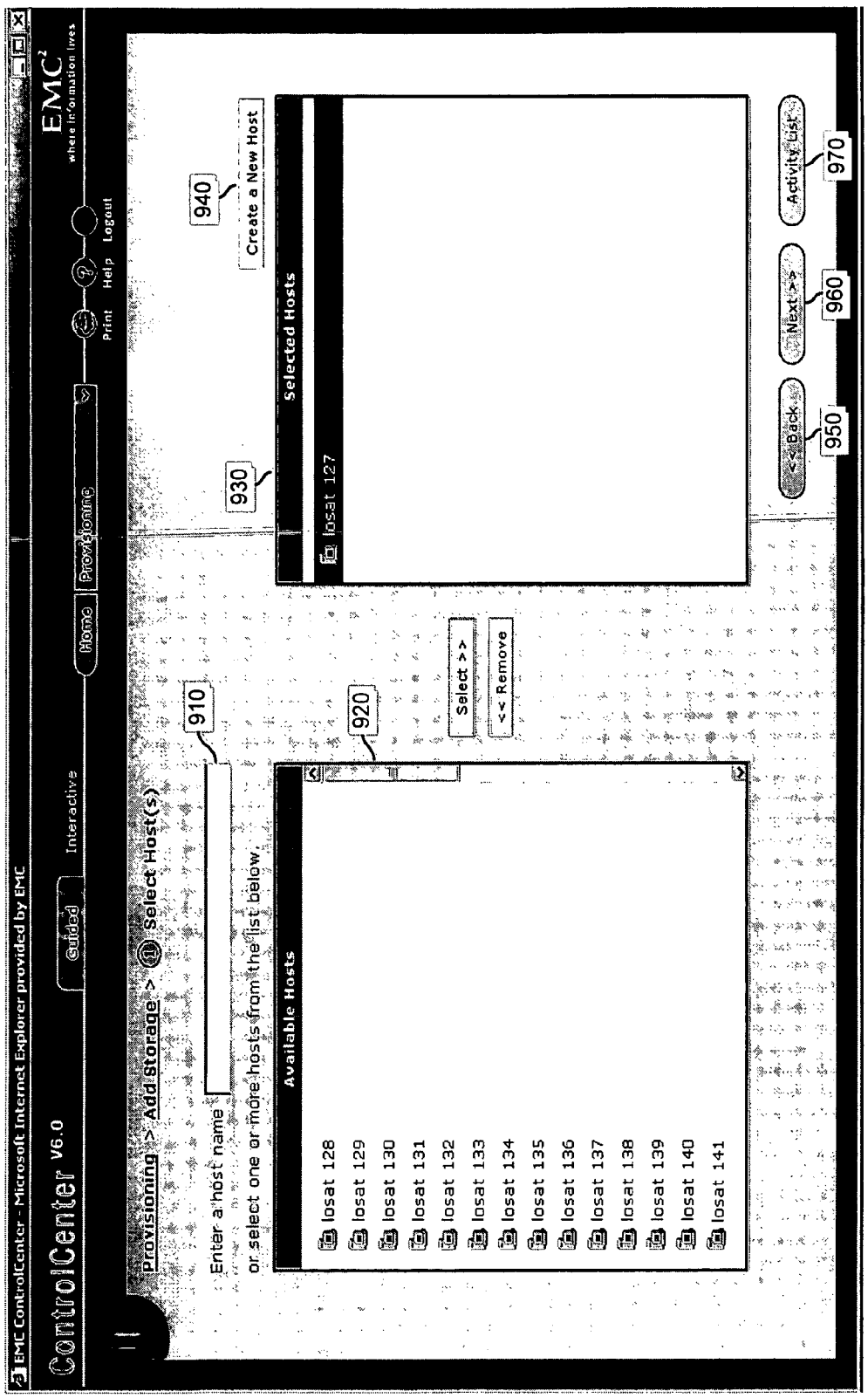
FIGS. 9-17 are respective screenshots of management views associated with process steps displayed in a list according to embodiments of the present application.

More particularly, FIG. 9 is a screenshot 900 associated with process step 420. As shown, screenshot 900 enables user 108 to provide a selection of a host resource for a respective process step associated with the selected management function (e.g., ADD storage). Selection may involve i) providing a host name in display region 910 identifying a host resource, ii) selecting host resources from display region 920 of host resources, and iii) creating a new host resource via selection of icon 940. Display region 930 includes a list of host resources selected by the user 108. "Select" icon and "remove" icon respectively facilitate addition of host resources from display region 920 to display region 930 and removal of host resources from display region 930.

Additional selectable icons enable the user 108 to view other management views (e.g., screenshots) associated with a selected management function. For example, selection of activity list icon 970 enables a user 108 to revert back to viewing a current list of process steps (e.g., as shown in FIGS. 4-9) associated with the selected management function.

Back icon 950 and next icon 960 enable the user 108 to skip going back to a view of the list of process steps and their corresponding statuses. For example, user 108 can select next icon 970 to view screenshot 1000 (in FIG. 10) associated with the next process step in the list without going back to view the list again.

Figure 10:
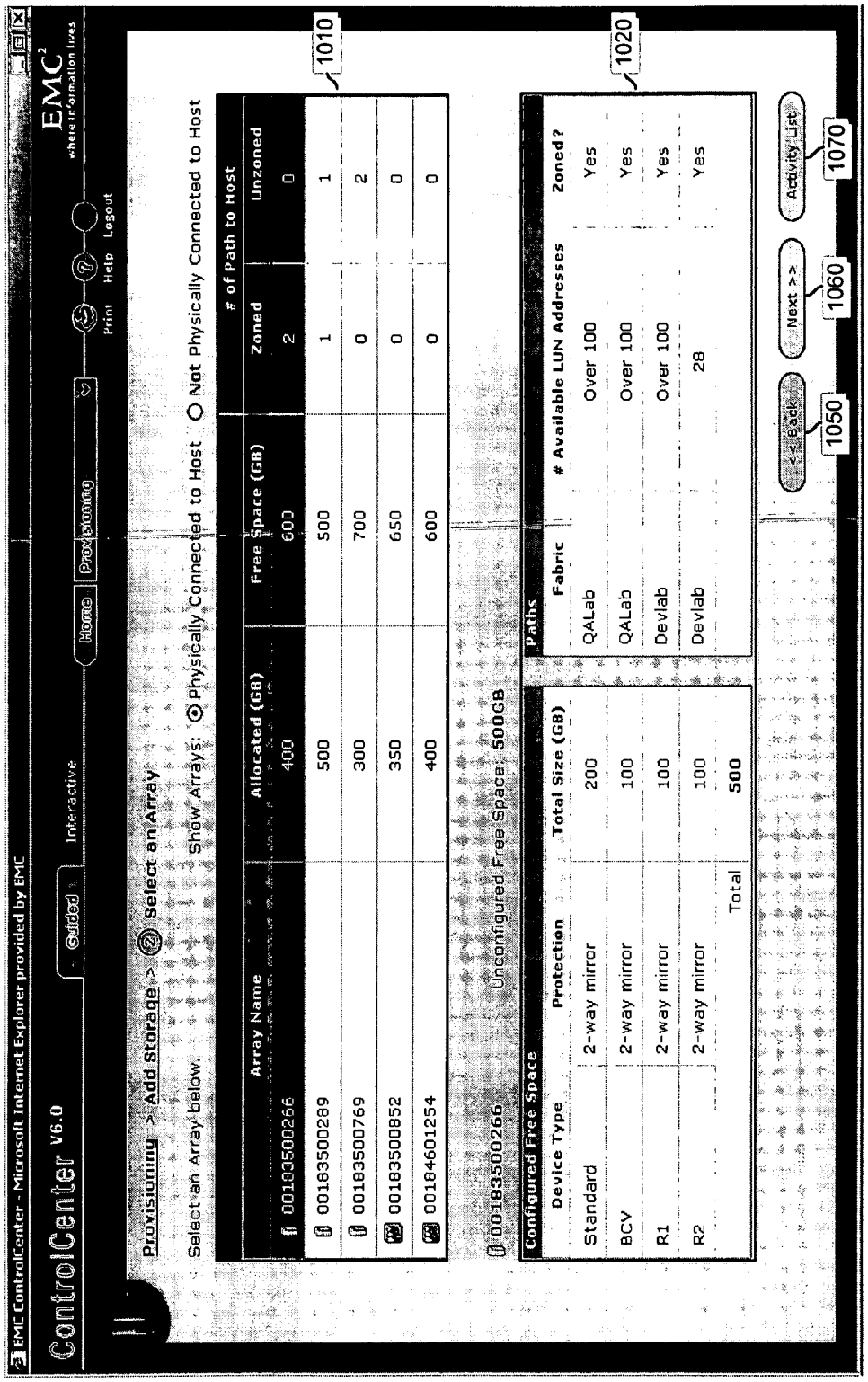

FIG. 10 is a screenshot 1000 associated with process step 421 (e.g., step 2). As shown, screenshot 1000 enables user 108 to provide a selection of a storage array for a respective process step associated with the selected management function (e.g., ADD storage). Selection of a storage array resource involves clicking on an entry in display region 1010. After selecting a storage array, resource manager 120 populates display region 1020 with further details associated with the selected storage array in display region 1010. When displaying storage arrays, user 108 has the option of selecting a view of arrays physically connected to the selected host and arrays not physically connected to the selected host resource.

In a similar manner as discussed, additional selectable icons enable the user 108 to view other management views associated with a selected management function. For example, selection of activity list icon 1070 enables a user 108 to revert back to viewing a current list of process steps (e.g., as shown in FIGS. 4-9) associated with the selected management function. Back icon 1050 and next icon 960 enable the user 108 to skip going back to a view of the list of process steps and their corresponding statuses. For example, user 108 can select next icon 1070 to view screenshot 1100 (in FIG. 11) associated with the next process step in the list without going back to view the list again. User 108 also can select back icon 1060 to view screenshot 900 (in FIG. 9) associated with the previous process step of selecting a host resource without going back to view the list again. Each of screenshots in FIGS. 9-17 includes similarly functioning back/next icons as well as an activity list icon to perform these functions.

Figure 11:
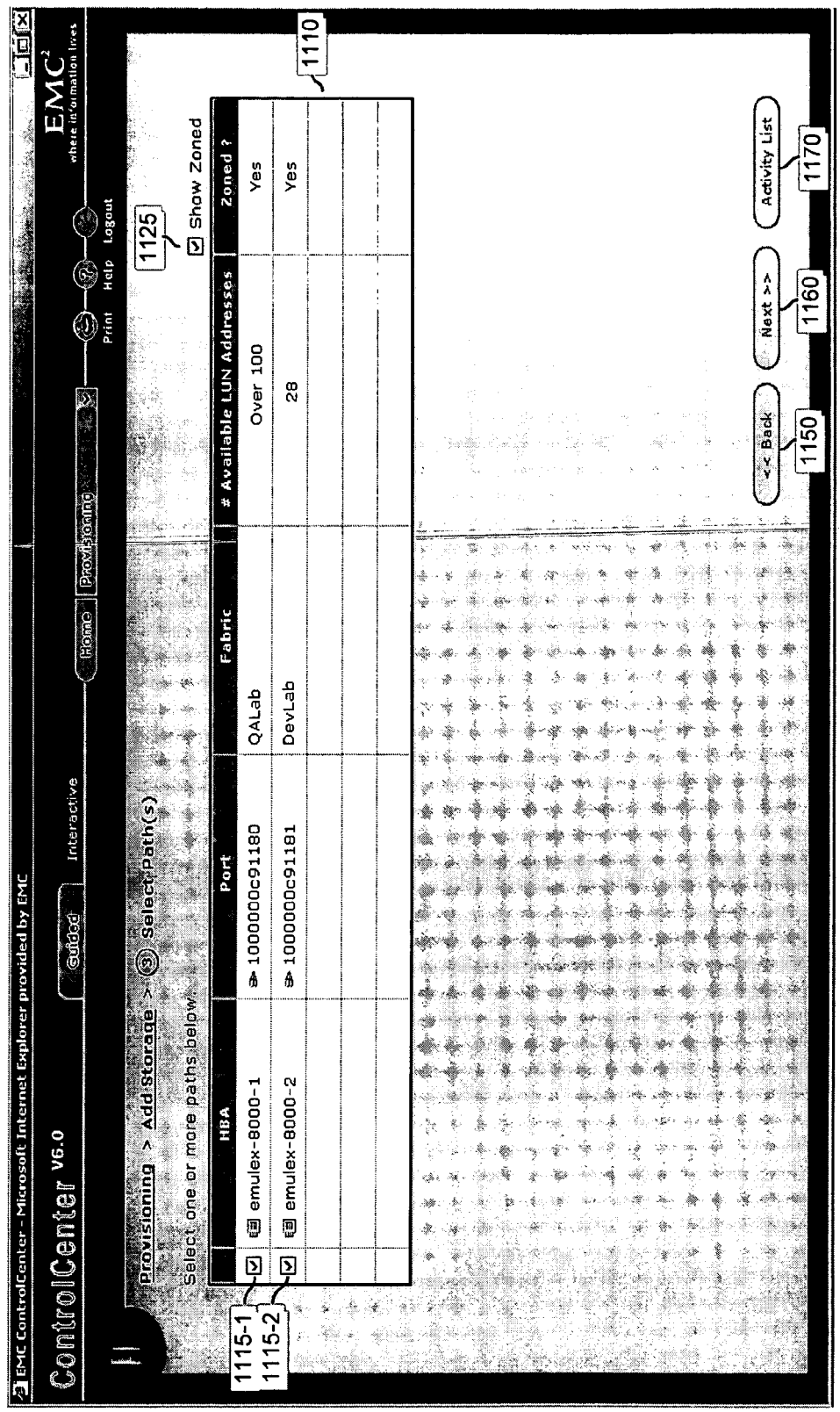

FIG. 11 is a screenshot 1100 associated with process step 422 (e.g., step 3). As shown, screenshot 1100 enables user 108 to provide a selection of paths for a respective process step associated with the selected management function (e.g., ADD storage). For example, display region 1110 includes a list of possible paths for selection. Selection by user 108 involves placing checkmarks in boxes 1115-1 and 1115-2 next to a corresponding path. User 108 has the option of showing zone paths by clicking on box 1125.

FIG. 12 is a screenshot 1200 associated with process step 423 (e.g., step 4). As shown, screenshot 1200 enables user 108 to provide or input a selection of storage devices for a respective process step associated with the selected management function (e.g., ADD storage). For example, display region 1210 enables a user 108 to filter which storage devices in storage area network 133 will be displayed in display region 1220. Display region 1225 provides further details of devices selected in display region 1220. "Select" icon and "remove" icon in screenshot 1200 respectively facilitate addition of devices from display region 1220 to display region 1230 and removal of host resources from display region 1230.

FIG. 13 is a screenshot 1300 associated with process step 424 (e.g., step 5). As shown, screenshot 1300 enables user 108 to provide or input a selection of storage array ports for a respective process step associated with the selected management function (e.g., ADD storage). For example, display region 1310 includes a list of possible storage array ports for selection by user 108. Selection involves placing checkmarks by clicking on respective boxes 1315 next to a corresponding array port. User 108 has the option of showing zoned array ports by clicking on box 1325.

Figure 14:
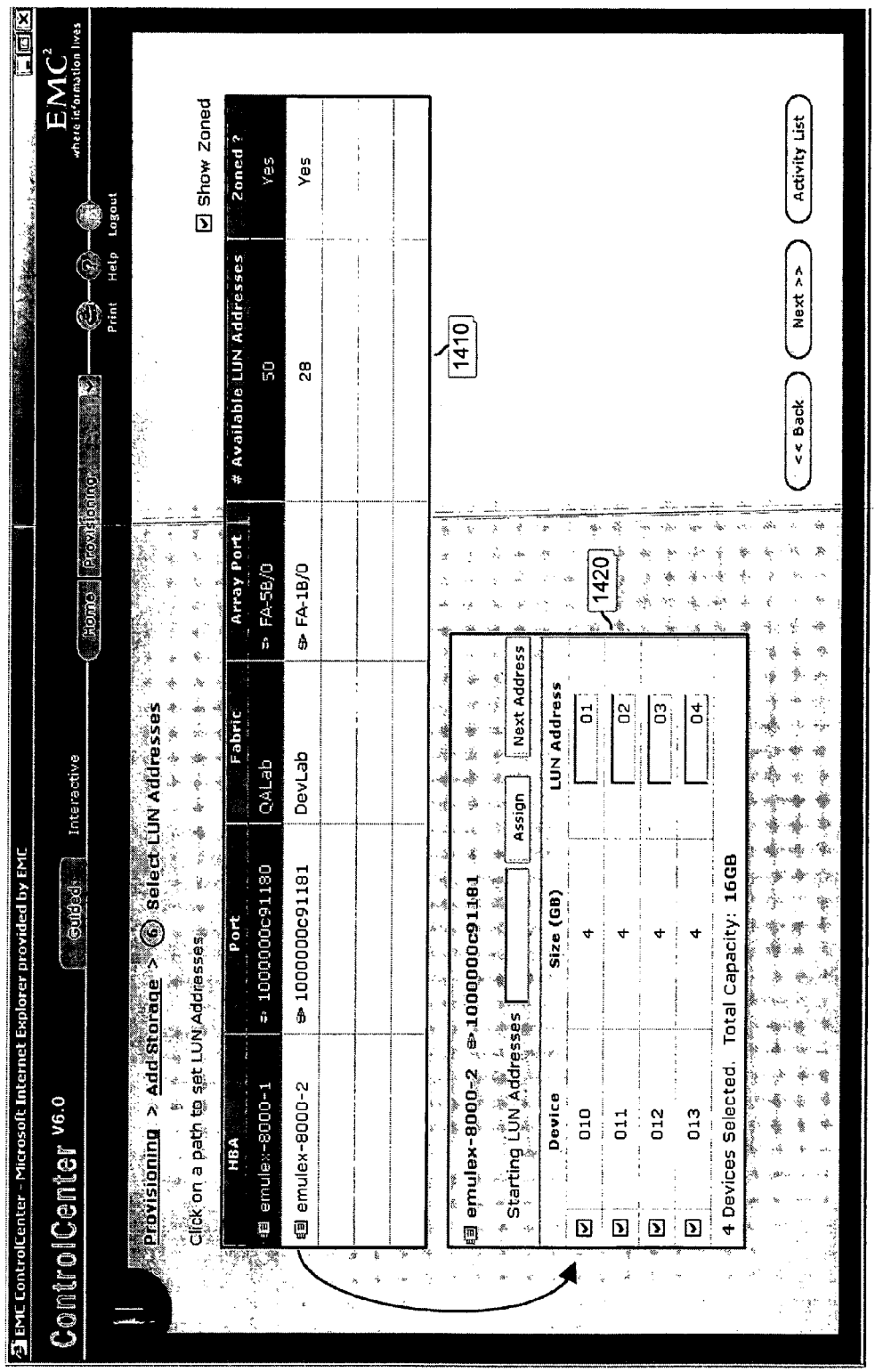

FIG. 14 is a screenshot 1400 associated with process step 425 (e.g., step 6). As shown, screenshot 1400 enables user 108 to input a selection of further LUN address for a respective process step associated with the selected management function (e.g., ADD storage). For example, display region 1410 includes the list of selections by user 108 for previous screenshot 1300. For each selected host to array ports, display region 1420 enables user 108 to provide a starting LUN address and thereafter assign further LUN addresses (e.g., 01, 02, 03, 04) by clicking on "next address" icon for other selected devices (e.g., 010, 011, 012, 013).

Figure 15:
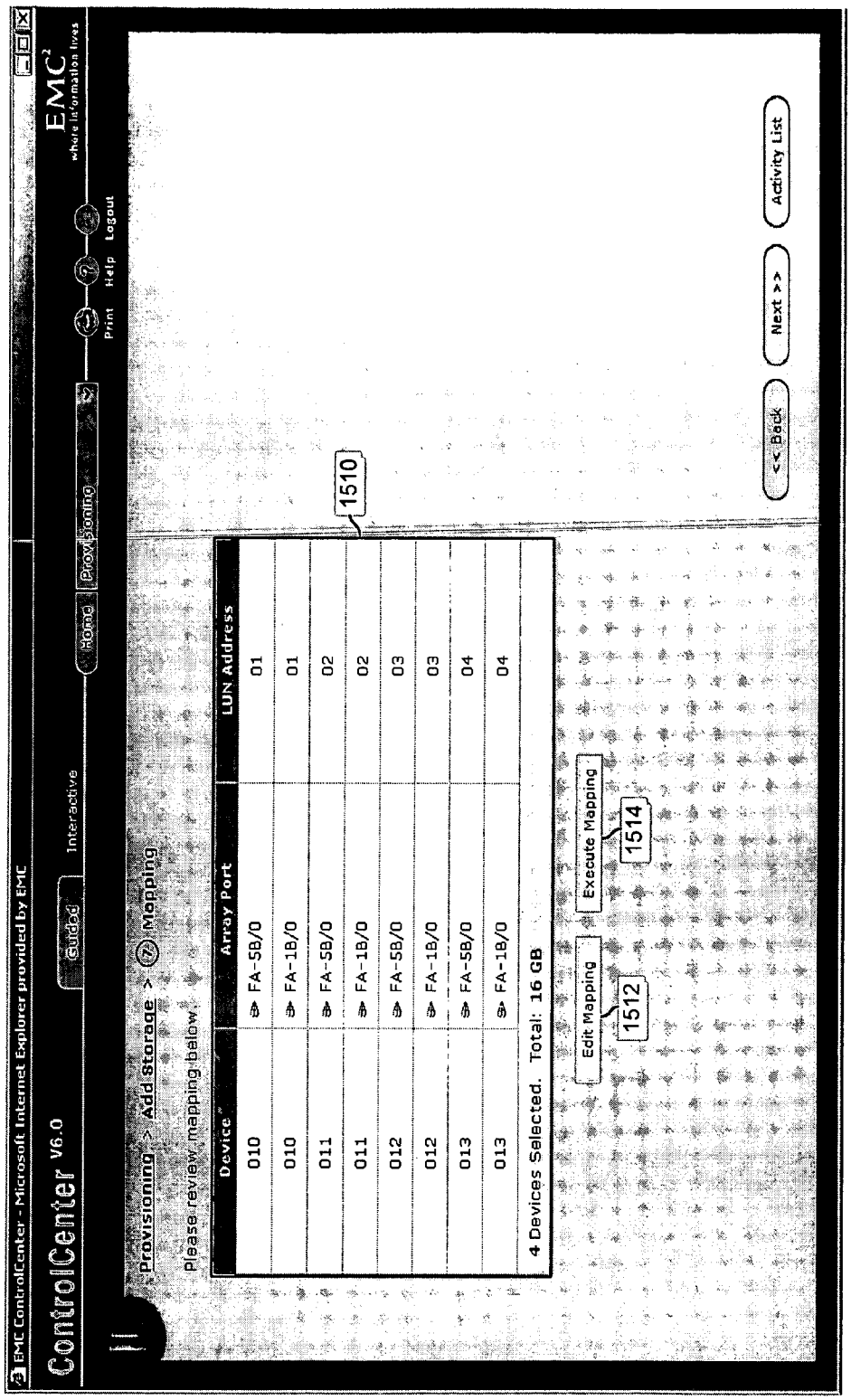

FIG. 15 is a screenshot 1500 associated with process step 426 (e.g., step 7). As shown, screenshot 1500 enables user 108 to execute a mapping function for a respective process step associated with the selected management function (e.g., ADD storage). For example, display region 1510 includes a list of previously selected devices, array ports, and LUN addresses. Icon 1514 enables user 108 to execute a mapping associated with the selected resources displayed in display region 1510. Icon 1512 enables user 108 to edit the mapping.

As previously discussed, resource manager 120 can execute a mapping function as a background computer function while the user 108 is able to perform other process steps. Also, as discussed, while resource manager 120 executes the mapping function, column 656 of FIG. 6 indicates that "mapping" in process step 426 is currently "executing" (e.g., in progress) so that user 108 is made aware of its busy status. In one application, after the user performs a respective process step, the user is not able to execute the whole activity associated with the management function via the "execute activity" button in FIG. 6.

Figure 16:
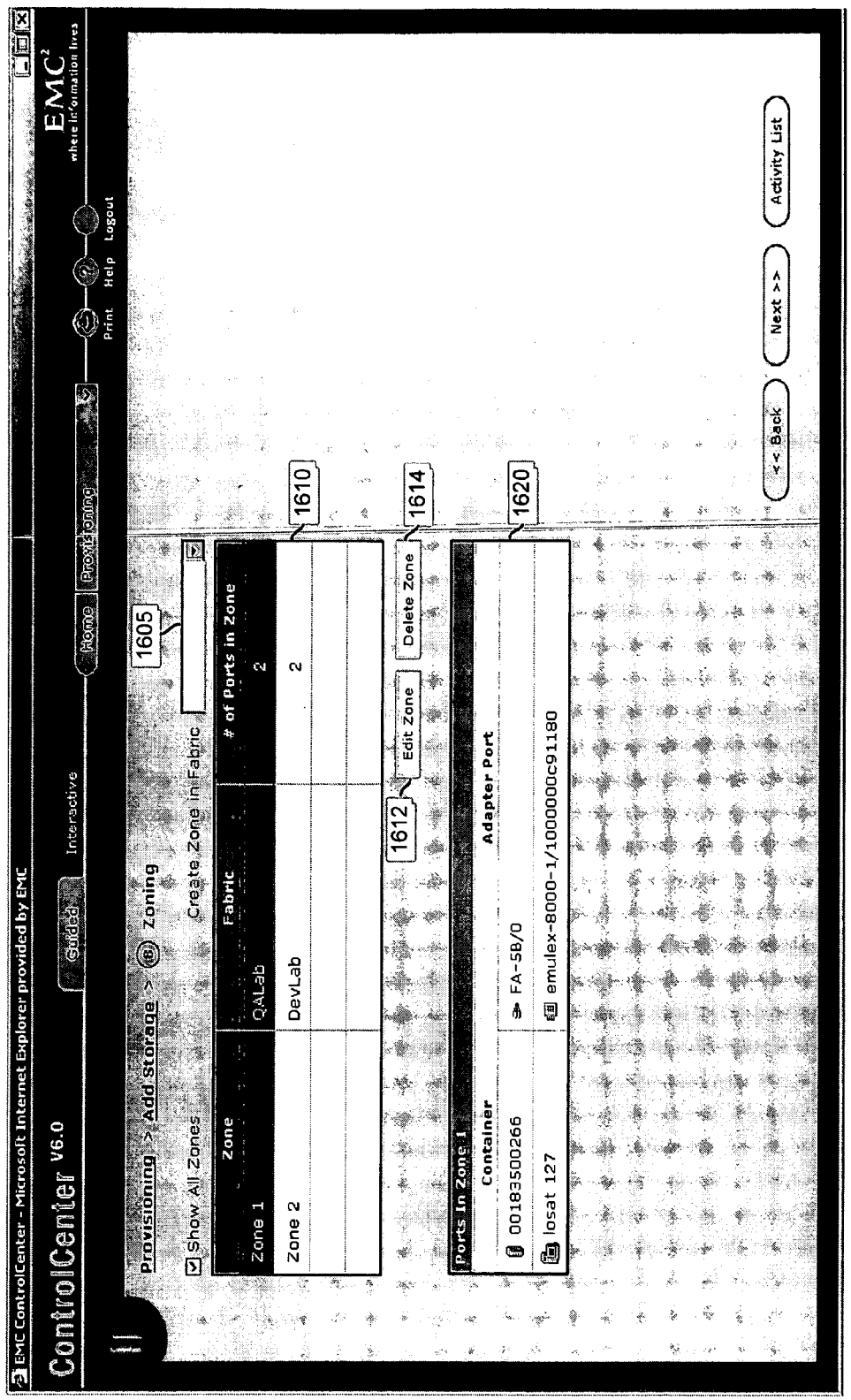

FIG. 16 is a screenshot 1600 associated with process step 427 (e.g., step 8). As shown, screenshot 1600 enables user 108 to execute zoning for a respective process step associated with the selected management function (e.g., ADD storage). For example, display region 1610 includes a list of zones associated with previously selected storage area network resources for previous process steps. Data field 1605 enables user 108 to create a new zone in the fabric. For a highlighted zone in display region 1610, display region 1620 includes container and adapter port information. Edit zone icon 1612 enables user 108 to edit zone information associated with the highlighted zone in display region 1610. Delete zone icon 1614 enables user 108 to delete a highlighted zone in display region 1610.

Figure 17:
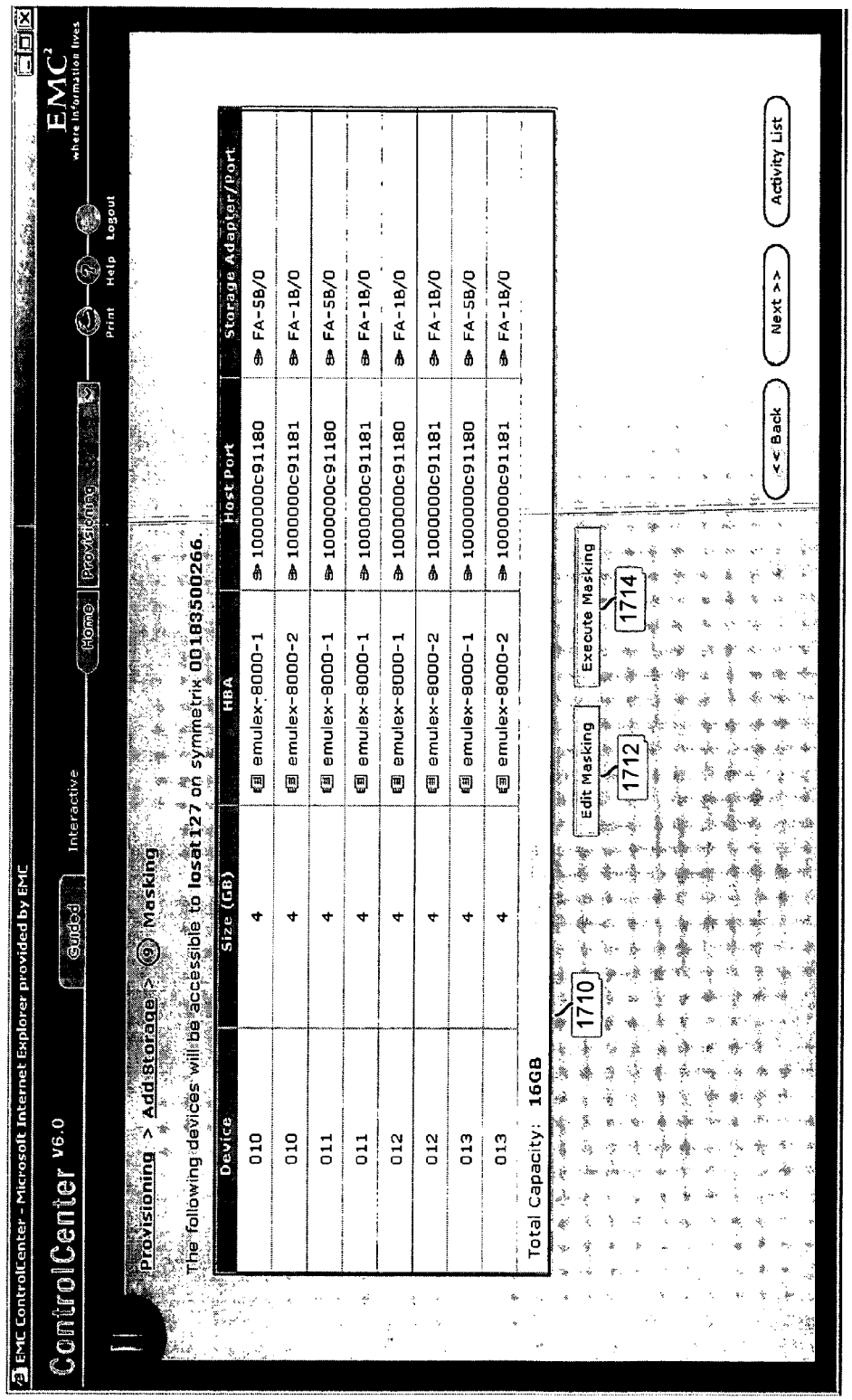

FIG. 17 is a screenshot 1700 associated with process step 428 (e.g., step 9). As shown, screenshot 1700 enables user 108 to execute masking for a respective process step associated with the selected management function (e.g., ADD storage). For example, display region 1710 includes a list of devices associated with a storage array resource (i.e., 00183500266) that will be available to selected host resource (i.e., losat127). Display region 1710 identifies a size, host bus adapters, host ports and storage array adapters/ports associated with corresponding selected storage devices.

Execute masking icon 1714 enables user 108 to execute a masking function for devices displayed in display region 1710. Edit masking icon 1712 enables user 108 to manually modify masking associated with the selected storage devices in display region 1710. When a user clicks on "edit masking," resource manager 120 opens a dialog including pre-selected data based on a user's selection in previous process steps.

FIGS. 18-22 are flowcharts illustrating various techniques of guiding a user through a management process associated with a storage area network according to embodiments of the present application.

Figure 18:
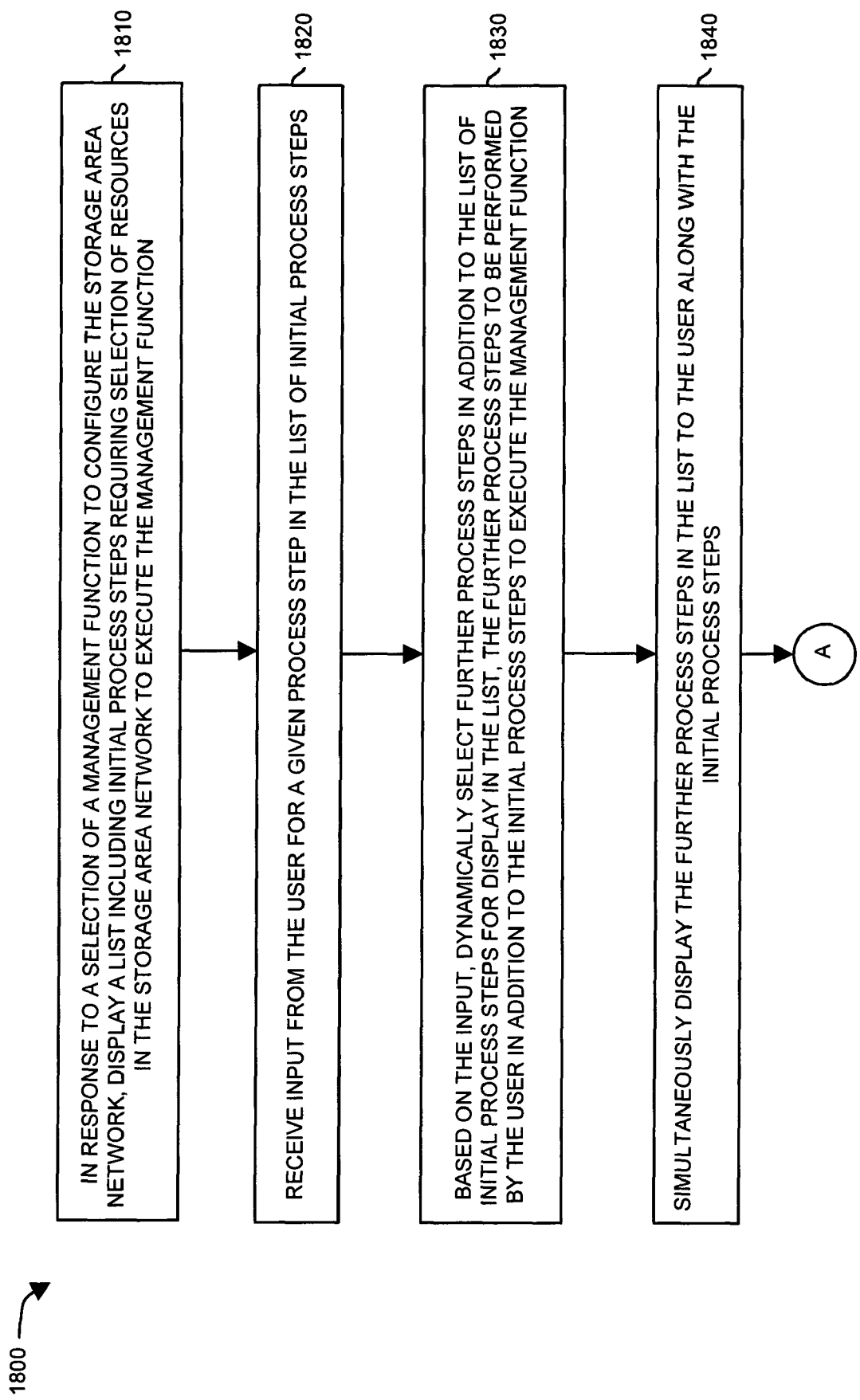
FIGS. 18-22 are flowcharts illustrating various techniques of guiding a user through a management process associated with a storage area network according to embodiments of the present application.
Figure 19:
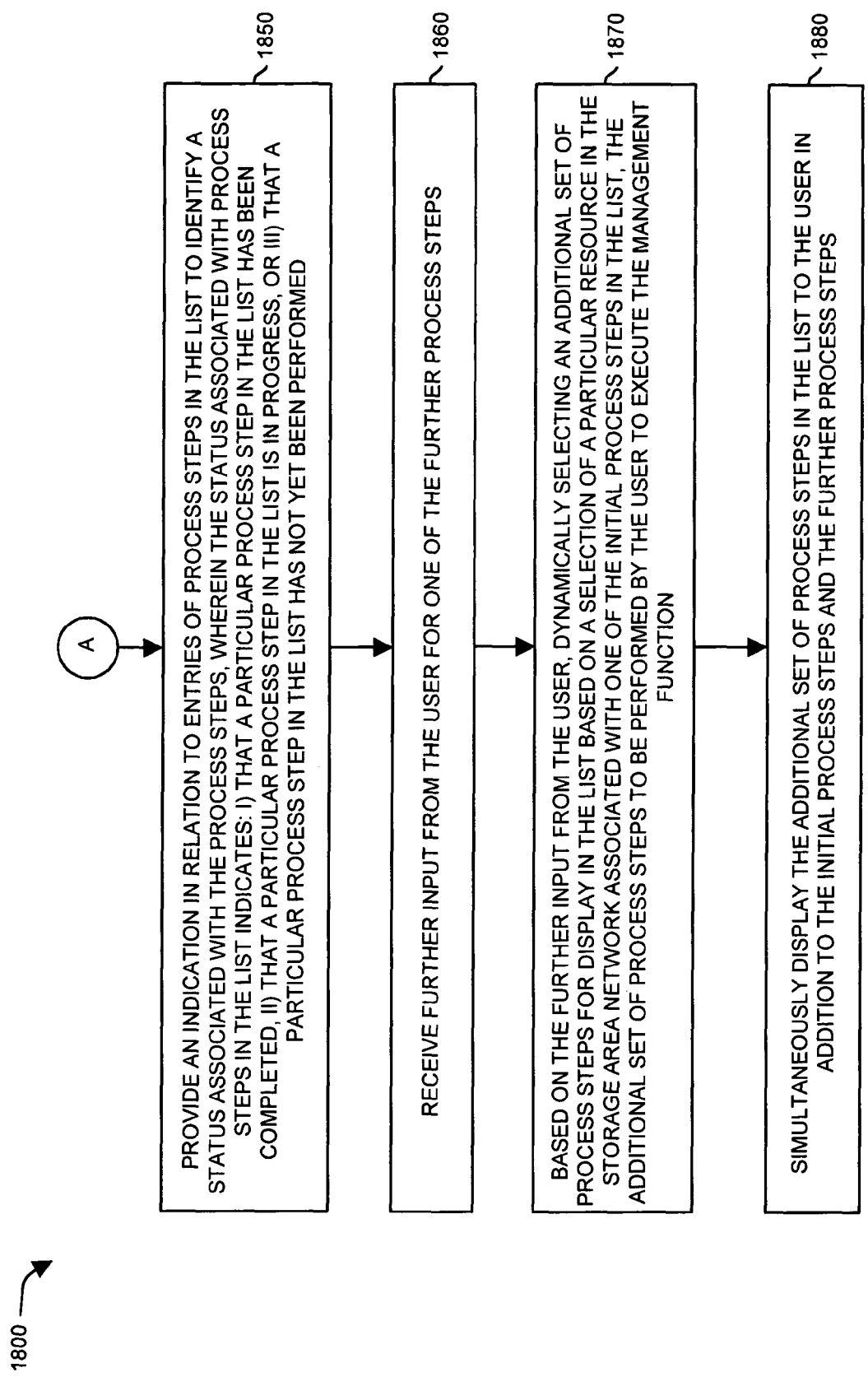

More particularly, FIGS. 18 and 19 combine to form flowchart 1800 illustrating processing steps performed by resource manager 120. As discussed, resource manager 120 enables user 108 of the management station computer system 110 to be guided through execution of a management function such as adding storage, removing storage, etc.

In step 1810 of FIG. 18, in response to a selection of a management function to configure the storage area network environment 133, resource manager 120 displays a list including initial process steps requiring selection of resources in the storage area network environment 133 to execute the management function.

In step 1820, resource manager 120 receives input from the user 108 for a given process step in a list of initial process steps (e.g., process steps 420, 421, and 422 shown in FIG. 4).

In step 1830 based on the input (e.g., selection of a resource), the resource manager 120 dynamically selects further process steps (e.g., process step 423 and 424 shown in FIG. 5) in addition to the list of initial process steps (e.g., process steps 420, 421, and 422 shown in FIG. 5) for display in the list of process steps. The further process steps will also be performed by the user 108 in addition to the initial process steps to execute the selected management function (e.g., ADD storage function).

In step 1840, the resource manager 120 simultaneously displays the further process steps (e.g., process step 423 and 424) in the list to the user 108 along with the initial process steps (e.g., process steps 420, 421, and 422).

In step 1850 of FIG. 19, the resource manager 120 provide an indication (e.g., column of status entries in column 556 of FIG. 5) in relation to entries of process steps in the list to identify a status associated with the process steps. As discussed, a status associated with process steps in the list may indicate: i) that a particular process step in the list has been completed (e.g., the process step has either failed or successfully completed), ii) that a particular process step in the list is in progress, or iii) that a particular process step in the list has not yet been performed.

In step 1860, the resource manager 120 receives further input from the user 108 for one of the further process steps (e.g., process step 423 and 424).

In step 1870, based on the further input from the user such as a selection of resources, the resource manager 120 dynamically selects an additional set of process steps (e.g., process steps 425-428) for display in the list based on a selection of a particular resource in the storage area network associated with one of process steps 425-428.

In step 1880, the resource manager 120 simultaneously displays the additional set of process steps (e.g., process step 425-428) in the list to the user 108 in addition to the initial process steps (e.g., process step 420, 421, and 422) and the further process steps (e.g., process step 423 and 424). Consequently, the number of process steps in the displayed list grows and changes depending on selection of resources associated with the process steps.

Figure 20:
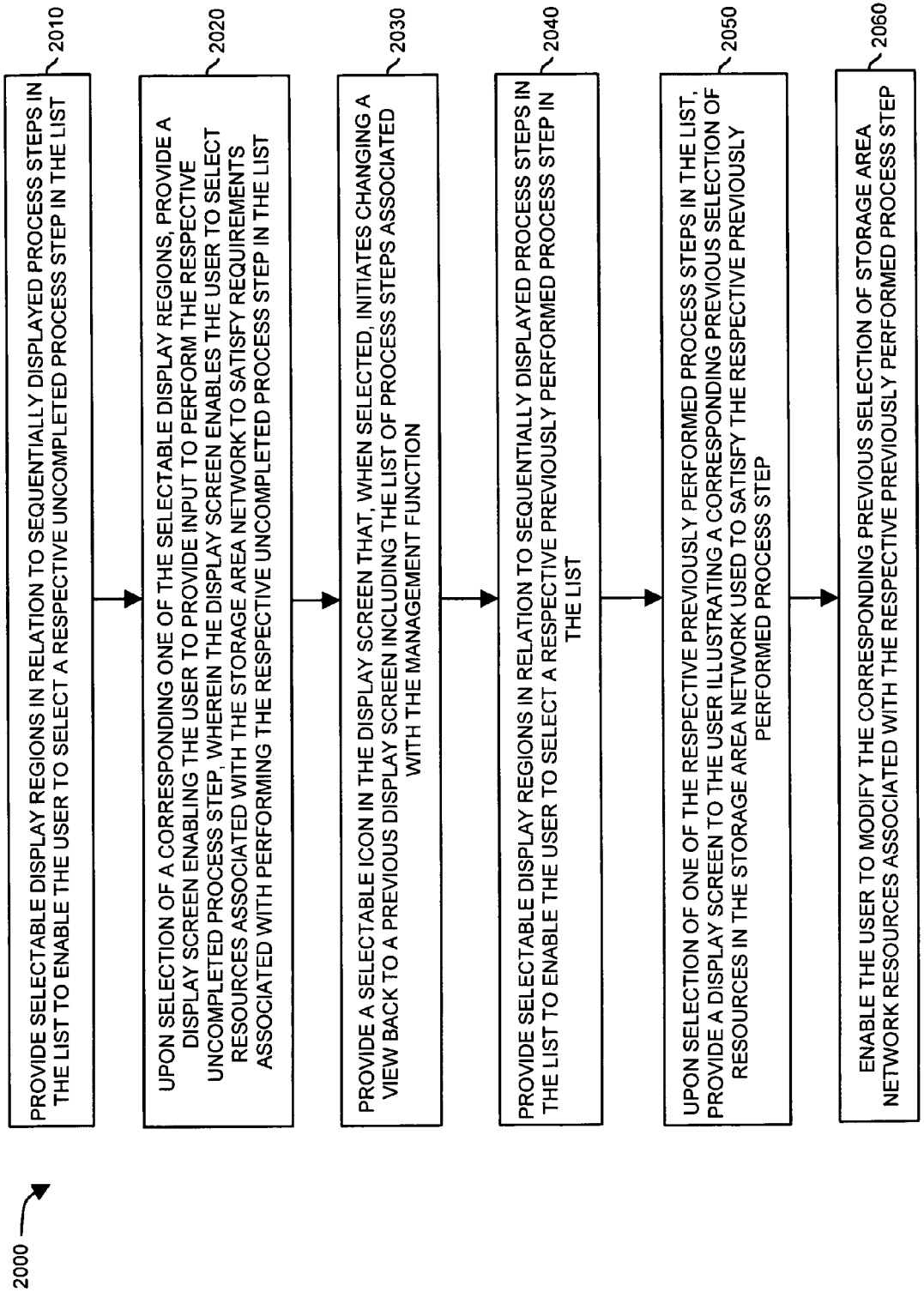

FIG. 20 is a flowchart 2000 illustrating processing steps performed by resource manager 120 to enable the user 108 to perform process steps and thereafter make changes to previously performed process steps.

For example, in step 2010, resource manager 120 provides selectable display regions (e.g., selectable circle icons in column 455 indicating steps 1, 2, and 3 in FIG. 4) in relation to sequentially displayed process steps in the list to enable the user 108 to select a respective uncompleted process step (e.g., process step 420, 421, or 422 in FIG. 4) in the list (i.e., column 455 of FIG. 4).

In step 2020, upon selection of a corresponding one of the selectable display regions, the resource manager 120 produces a display screen (e.g., screenshot 900 in FIG. 9) enabling the user 108 to provide input to perform the respective uncompleted process step (e.g., "select hosts" process step). In this example, the screenshot 900 enables the user 108 to select resources associated with the storage area network to satisfy requirements associated with performing the respective uncompleted process step 1 in the list.

In step 2030, resource manager 120 provides a selectable icon (e.g., icon 970 in FIG. 9) in the display screen that, when selected, initiates changing a view back to a previous display screen including the list of process steps (e.g., screenshot 400 in FIG. 4) associated with the selected management function (e.g., ADD storage). For example, screenshot 900 (of FIG. 9) includes icon 970 enabling user to go back to screenshot 400 in FIG. 4.

In step 2040, the resource manager 120 provides selectable display regions (e.g., step 1 icon, step 2 icon, and step 3 icon as in FIG. 5) in relation to sequentially displayed process steps 420, 421 and 422 in the list to enable the user 108 to select a respective previously performed process step in the list.

In step 2050, upon selection of one of the respective previously performed process steps in the list of FIG. 5, the resource manager 120 provides a graphical user interface (e.g., display screen) to the user illustrating a corresponding previous selection of resources in the storage area network used to satisfy the respective previously performed process step. For example, FIG. 5 illustrates that process steps 420, 421 and 422 have been completed. User 108 can review previous selections by clicking on step 1, step 2 or step 3 to display respective screenshot 900, 1000, or 1100.

In step 2060, the resource manager 120 enables the user 108 to modify the corresponding previous selection of storage area network resources associated with the respective previously performed process step. Consequently, a user 108 can initially make a selection of resource(s) for a given process step, perform additional process steps in a list, and thereafter go back and make changes to an original selection for a previous process step.

Figure 21:
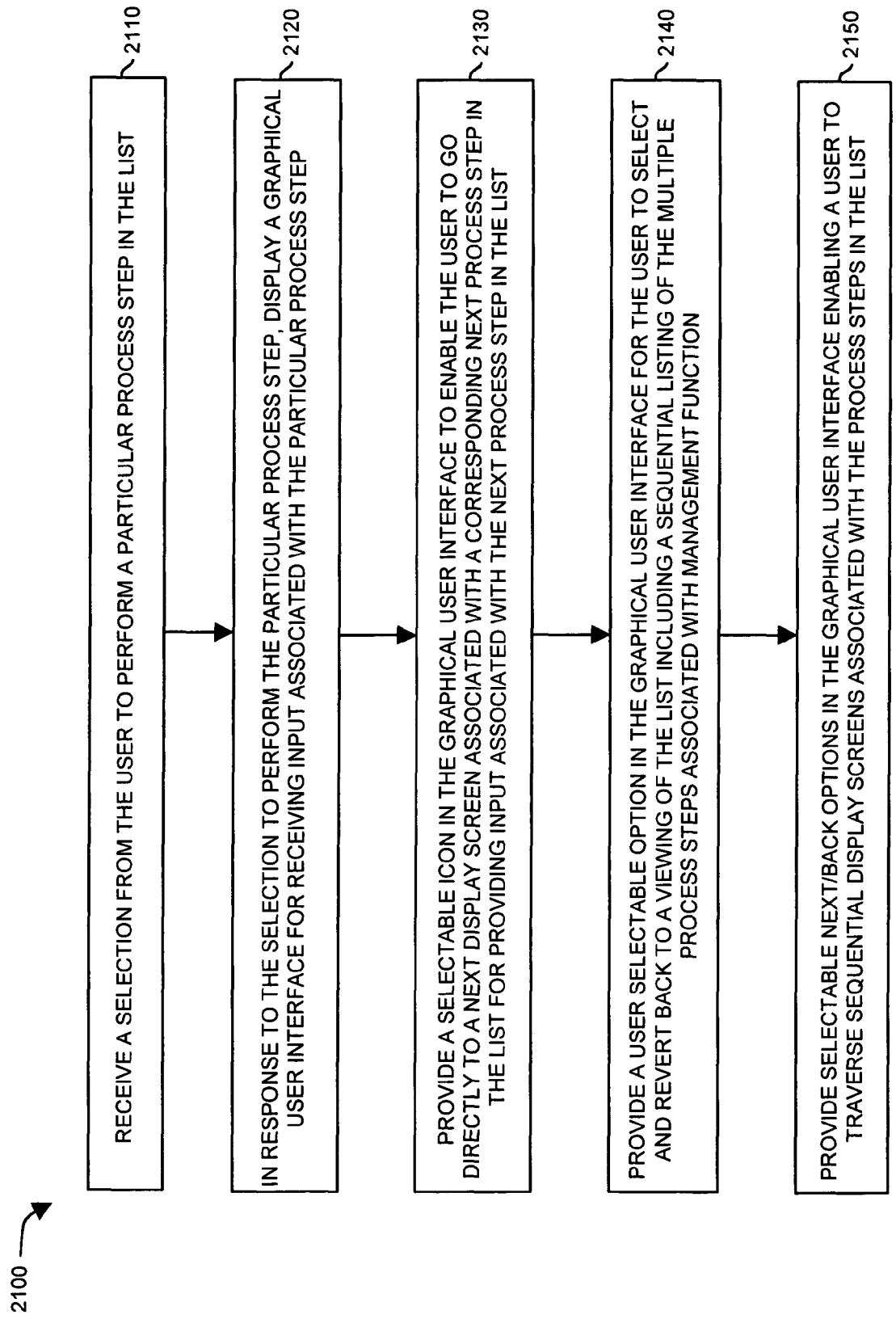

FIG. 21 is a flowchart 2100 illustrating processing steps performed by resource manager 120 to enable the user 108 to traverse through previously performed and yet to be completed process steps.

In step 2110, the resource manager 120 receives a selection from the user 108 to perform a particular process step in a list of process steps such as in column 455 of FIG. 4. For example, user 108 can select process step 420 in FIG. 4 to go to screenshot 900 in FIG. 9 to provide selection of host resources.

In step 2120, in response to the selection to perform the particular process step, the resource manager 120 displays a graphical user interface (e.g., screenshot 900 in FIG. 9) for receiving input associated with the particular process step.

In step 2130, the resource manager 120 provides a selectable icon in the graphical user interface to enable the user 108 to go directly to a next display screen associated with a corresponding next process step in the list for providing input associated with the next process step in the list. For example, if user 108 presently views screenshot 900 in FIG. 9, user 108 can select icon 960 to go forward to screenshot 1000 in FIG. 10 and provide input associated with process step 421.

In step 2140, the resource manager 120 provides a user selectable option in the graphical user interface (e.g., screenshot 1000 in FIG. 10) for the user 108 to select and revert back to a viewing of the list including a sequential listing of the multiple process steps associated with management function. For example, user 108 can click on icon 1170 in FIG. 11 to revert back to screenshot 500 in FIG. 5.

In step 2150, the resource manager 120 provides selectable next/back options in the graphical user interface enabling a user 108 to traverse sequential display screens associated with the process steps in the list. For example, if user 108 presently views screenshot 1000 in FIG. 10, user 108 can select icon 1050 to go back to screenshot 900 in FIG. 9. As discussed, user 108 can select icon 1060 in FIG. 10 to go forward to screenshot 1100 in FIG. 11.

Figure 22:
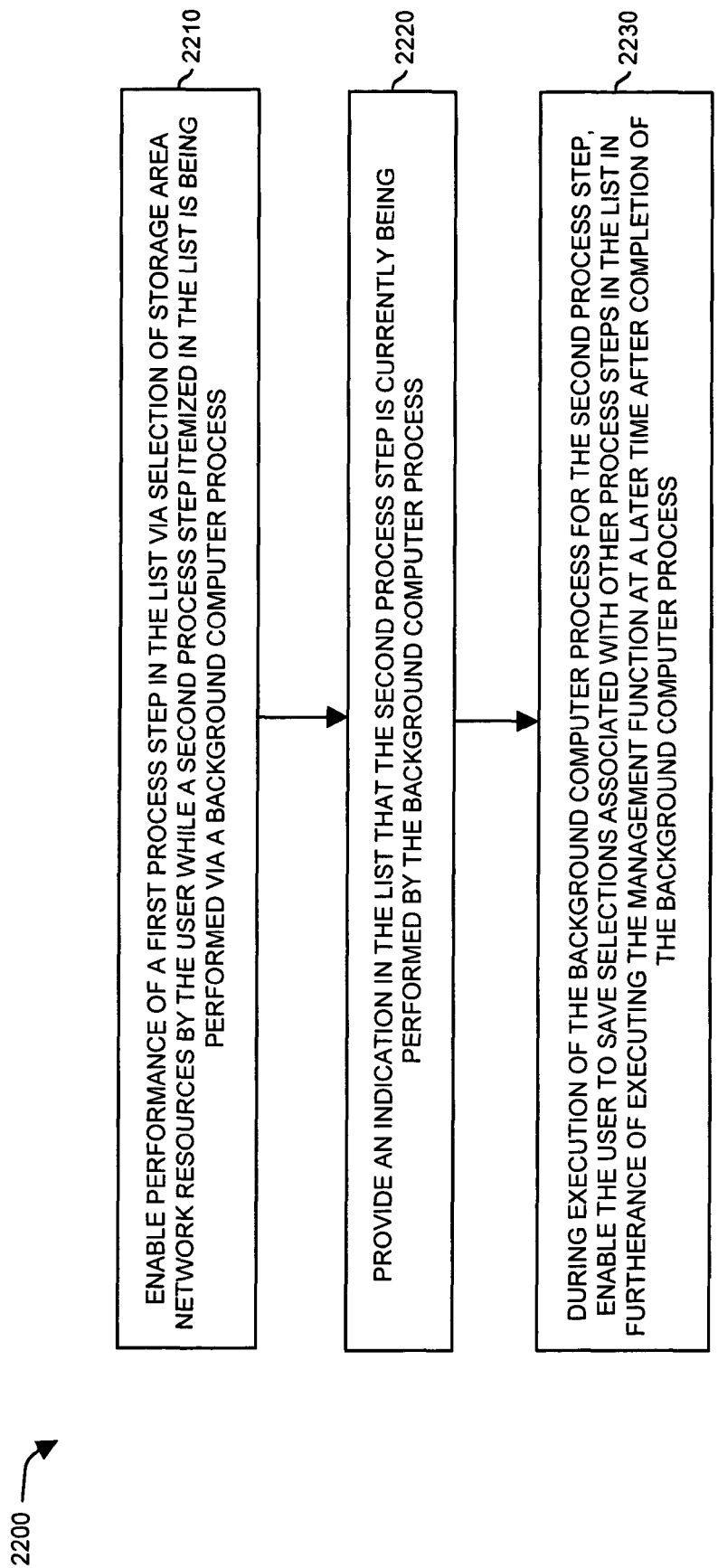

FIG. 22 is a flowchart 2200 illustrating processing steps performed by resource manager 120 to enable the user 108 to perform process steps and thereafter make changes to previously performed process steps.

In step 2210, resource manager 120 enables performance of a first process step in the list of process steps via selection of storage area network resources by user 108 while a second process step itemized in the list is being performed via a background computer process. For example, resource manager 120 enables user 108 to initiate execution of mapping in process step 426 as shown in screenshot 1500 in FIG. 15. During execution of mapping via a computer process, resource manager 120 enables user 108 to perform zoning selections in screenshot 1600 of FIG. 16.

In step 2220, resource manager 120 provides an indication in the process step list that the mapping process step is currently being performed by, for example, a background computer process. That is, screenshot 600 in FIG. 6 includes an indication that a mapping process runs in the background and zoning in process step 427 has been completed.

In step 2230, during execution of the background computer process for the mapping process step 426, resource manager 120 enables user 108 to save selections associated with other process steps in the list in furtherance of executing the management function at a later time after completion of the background computer process. For example, screenshot 600 in FIG. 6 includes icon 670 to save a work session including selections associated with the multiple completed process steps. In one application, resource manager 120 continues to execute a pending mapping function even after saving settings associated with a work session. Thus, when user 108 returns a following day, completed process steps can be applied to the storage area network environment 133 to execute the corresponding selected management function.

As discussed, techniques herein are well suited for use in applications such as management of storage area networks. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method of guiding a user through a management process associated with a storage area network, the method comprising:
   in response to a selection of a management function to configure the storage area network, displaying a list including initial process steps requiring selection of resources in the storage area network to execute the management function;
   receiving input from the user for a given process step in the list of initial process steps;
   based on the input, dynamically selecting further process steps in addition to the list of initial process steps for display in the list, the further process steps to be performed by the user in addition to the initial process steps to execute the management function; and
   simultaneously displaying the further process steps in the list to the user along with the initial process steps.

2. A method as in claim 1 further comprising:
   prior to dynamically selecting the further process steps, providing blank entries in the list beneath the initial process steps; and
   after dynamically selecting the further process steps, overwriting the blank entries with corresponding text to identify the further process steps.

3. A method as in claim 1 further comprising:
   receiving further input from the user for one of the further process steps;
   based on the further input from the user, dynamically selecting an additional set of process steps for display in the list, the additional set of process steps to be performed by the user to execute the management function; and
   simultaneously displaying the additional set of process steps in the list to the user in addition to the initial process steps and the further process steps.

4. A method as in claim 1 further comprising:
   providing an indication in relation to entries of process steps in the list to identify a status associated with the process steps; and
   wherein the status associated with process steps in the list indicates:
   i) that a first process step in the list has been successfully completed,
   ii) that a second process step in the list is in progress, and
   iii) that a third process step in the list has not yet been performed.

5. A method as in claim 1 further comprising:
   providing selectable display regions in relation to sequentially displayed process steps in the list to enable the user to select a respective uncompleted process step in the list; and
   upon selection of a corresponding one of the selectable display regions, providing a display screen enabling the user to provide input to perform the respective uncompleted process step.

6. A method as in claim 5, wherein the display screen enables the user to select resources associated with the storage area network to satisfy requirements associated with performing the respective uncompleted process step in the list, the method further comprising:
   providing a selectable icon in the display screen that, when selected, initiates changing a view back to a previous display screen including the list of process steps associated with the management function.

7. A method as in claim 1 further comprising:
   providing selectable display regions in relation to sequentially displayed process steps in the list to enable the user to select a respective previously performed process step in the list;
   upon selection of one of the respective previously performed process steps in the list, providing a display screen to the user illustrating a corresponding previous selection of resources in the storage area network used to satisfy the respective previously performed process step; and
   enabling the user to modify the corresponding previous selection of resources associated with the respective previously performed process step.

8. A method as in claim 1 further comprising:
   enabling addition of a user-created process step for inclusion in the list of displayed process steps; and
   wherein the user-created process step added to the list does not require formal interaction with a graphical user interface to complete the added user-created process step in furtherance of executing the management function but is instead a reminder to perform an external user task associated with execution of the management function.

9. A method as in claim 1 further comprising:
   receiving a selection from the user to perform a particular process step in the list;
   in response to the selection to perform the particular process step, displaying a graphical user interface for receiving input associated with the particular process step; and
   providing a selectable icon in the graphical user interface to enable the user to go directly to a next display screen associated with a corresponding next process step in the list for providing input associated with the next process step in the list.

10. A method as in claim 9 further comprising:
    providing a user selectable option in the graphical user interface for the user to select and revert back to a viewing of the list including a sequential listing of the multiple process steps associated with management function.

11. A method as in claim 9 further comprising:
    providing selectable next/back options in the graphical user interface enabling the user to traverse sequential display screens associated with the process steps in the list for selecting storage area network resources.

12. A method as in claim 1 further comprising:
    enabling performance of a first process step in the list via selection of storage area network resources by the user while a second process step itemized in the list is being performed via a background computer process;
    wherein the list includes an indication that the second process step is currently being performed by the background computer process; and
    during execution of the background computer process for the second process step, enabling the user to save selections associated with other process steps in the list in furtherance of executing the management function at a later time after completion of the background computer process.

13. A method as in claim 1, wherein dynamically selecting further process steps in addition to the list of initial process steps includes selecting the further process steps for inclusion in the table based on a selection of a particular resource in the storage area network associated with one of the initial process steps in the list.

14. A computer system as in claim 1 that additionally performs operations of:
enabling addition of a user-created process step for inclusion in the list of displayed process steps; and
wherein the user-created process step added to the list does not require formal interaction with a graphical user interface to complete the added user-created process step in furtherance of executing the management function but is instead a reminder to perform an external user task associated with execution of the management function.

15. A computer system as in claim 14 that additionally performs operations of:
receiving a selection from the user to perform a particular process step in the list;
in response to the selection to perform the particular process step, displaying a graphical user interface for receiving input associated with the particular process step; and
providing a selectable icon in the graphical user interface to enable the user to go directly to a next display screen associated with a corresponding next process step in the list for providing input associated with the next process step in the list.

16. A computer system as in claim 15 that additionally performs operations of:
providing a user selectable option in the graphical user interface for the user to select and revert back to a viewing of the list including a sequential listing of the multiple process steps associated with management function.

17. A computer system as in claim 15 that additionally performs operations of:
providing selectable next/back options in the graphical user interface enabling the user to traverse sequential display screens associated with the process steps in the list for selecting storage area network resources.

18. The method as in claim 1, wherein displaying the list includes:
via a processor device in a computer system, prior to receiving the input from the user, initiating display of at least one unpopulated entry in the list on a display screen; and
subsequent to receiving selection of a particular resource for the given process step:
selecting, based on the input from the user for the given process step, a supplemental process step to be performed by the user in addition to the initial process steps to execute the management function; and
populating the at least one unpopulated entry in the list with text indicating the supplemental process step.

19. The method as in claim 1, wherein displaying the list includes:
prior to receiving the input from the user:
via a processor device in a computer system, initiating display of a first entry in the list, the first entry specifying the given process step, the given process step requiring selection of a resource amongst multiple resources in the storage area network; and
initiating display of at least one unpopulated entry in the list.

20. The method as in claim 19, wherein receiving input from the user includes receiving selection of the given process step in the list;
in response to receiving the selection of the given process step in the list:
in lieu of displaying the list, initiating display of a graphical user interface for selecting amongst the multiple resources in the storage area network, the graphical user interface including display of the multiple resources, the graphical user interface including display of a selectable icon to return to viewing the list.

21. The method as in claim 20 further comprising:
receiving selection of a particular resource from the multiple resources, the multiple resources displayed in the graphical user interface;
subsequent to receiving selection of the particular resource and in response to receiving selection of the selectable icon, initiating display of the list in lieu of displaying the graphical user interface;
subsequent to receiving selection of the particular resource for the given process step and receiving selection of the selectable icon:
selecting, based on the input from the user for the given process step, a supplemental process step to be performed by the user in addition to the initial process steps to execute the management function;
displaying an updated version of the list, the updated version of the list including the initial process steps; and
in the updated version of the list, populating the at least one unpopulated entry with text indicating the supplemental process step.

22. The method as in claim 21 further comprising:
displaying status information in the updated version of the list to indicate that the given process step has been completed based at least in part on selection of the particular resource.

23. The method as in claim 1 further comprising:
providing an indication in relation to entries of the initial process steps in the list to identify a status associated with the initial process steps, wherein the status associated with a first initial process step in the list indicates that the first initial process step has been completed;
at a processor device in a computer system, receiving further input from the user for one of the further process steps;
based on the further input from the user, dynamically selecting an additional set of process steps for display in the list based on a selection of a particular resource in the storage area network, the additional set of process steps to be performed by the user to execute the management function;
in addition to displaying the initial process steps and the further process steps in the list, initiating display of the additional set of process steps in the list for viewing by the user.

24. The method as in claim 23 further comprising:
prior to dynamically selecting the further process steps, displaying blank entries in the list beneath the initial process steps; and
after dynamically selecting the further process steps, overwriting the blank entries with corresponding text to identify the further process steps to be executed by the user;
displaying an indication in the list that at least one process step in the list is in progress; and
displaying an indication in the list that at least one process step in the list has not yet been performed.

25. A computer system supporting guiding a user through a management process associated with a storage area network, the computer system comprising:
- a processor;
- a memory unit that stores instructions associated with an application executed by the processor; and
- an interconnect coupling the processor and the memory unit, enabling the computer system to execute the application and perform operations of:
  - in response to a selection of a management function to configure the storage area network, displaying a list including initial process steps requiring selection of resources in the storage area network to execute the management function;
  - receiving input from the user for a given process step in the list of initial process steps;
  - based on the input, dynamically selecting further process steps in addition to the list of initial process steps for display in the list, the further process steps to be performed by the user in addition to the initial process steps to execute the management function; and
  - simultaneously displaying the further process steps in the list to the user along with the initial process steps.

26. A computer system as in claim 25 that additionally performs operations of:
- prior to dynamically selecting the further process steps, providing blank entries in the list beneath the initial process steps; and
- after dynamically selecting the further process steps, overwriting the blank entries with corresponding text to identify the further process steps.

27. A computer system as in claim 25 that additionally performs operations of:
- receiving further input from the user for one of the further process steps;
- based on the further input from the user, dynamically selecting an additional set of process steps for display in the list, the additional set of process steps to be performed by the user to execute the management function; and
- simultaneously displaying the additional set of process steps in the list to the user in addition to the initial process steps and the further process steps.

28. A computer system as in claim 25 that additionally performs an operation of:
- providing an indication in relation to entries of process steps in the list to identify a status associated with the process steps; and
- wherein the status associated with process steps in the list indicates:
  - i) that a first process step in the list has failed or has successfully completed,
  - ii) that a second process step in the list is in progress, and
  - iii) that a third process step in the list has not yet been performed.

29. A computer system as in claim 25 that additionally performs operations of:
- providing selectable display regions in relation to sequentially displayed process steps in the list to enable the user to select a respective uncompleted process step in the list; and
- upon selection of a corresponding one of the selectable display regions, providing a display screen enabling the user to provide input to perform the respective uncompleted process step; and
- wherein the display screen enables the user to select resources associated with the storage area network to satisfy requirements associated with performing the respective uncompleted process step in the list.

30. A computer system as in claim 25 that additionally performs operations of:
- enabling performance of a first process step in the list via selection of storage area network resources by the user while a second process step itemized in the list is being performed via a background computer process;
- wherein the list includes an indication that the second process step is currently being performed by the background computer process; and
- during execution of the background computer process for the second process step, enabling the user to save selections associated with other process steps in the list in furtherance of executing the management function at a later time after completion of the background computer process.

31. A computer system as in claim 25, wherein dynamically selecting further process steps in addition to the list of initial process steps includes selecting the further process steps for inclusion in the table based on a selection of a particular resource in the storage area network associated with one of the initial process steps in the list.

32. The computer system as in claim 25 that additionally performs operations of:
- providing selectable display regions in relation to sequentially displayed process steps in the list to enable the user to select a respective uncompleted process step in the list;
- upon selection of a corresponding one of the selectable display regions, initiating display of a graphical user interface enabling the user to provide input to perform a respective uncompleted process step in the list, wherein the graphical user interface enables the user to select resources associated with the storage area network to satisfy requirements associated with performing the respective uncompleted process step in the list;
- providing a selectable icon in the graphical user interface that, when selected, initiates changing a view back to the list;
- providing selectable display regions in relation to sequentially displayed process steps in the list to enable the user to select a respective previously performed process step in the list;
- upon selection of one of the respective previously performed process steps in the list, providing a graphical user interface to the user, the graphical user interface illustrating a previous selection of resources in the storage area network used to satisfy the respective previously performed process step; and
- receiving input from the user to modify the previous selection of resources associated with the respective previously performed process step.

33. The computer system as in claim 32 that additionally performs operations of:
- based on input from the user, creating a user-created process step; and
- initiating display of the user-created process step in the list.

34. The computer system as in claim 33, wherein the user-created process step displayed in the list is a reminder to perform an external user task associated with execution of the management function.

35. The computer system as in claim 25 that additionally performs operations of:
- receiving a selection from the user to perform a particular process step amongst multiple process steps displayed in the list;

in response to the selection to perform the particular process step, displaying a graphical user interface for receiving selection of a resource for the particular process step;

displaying a selectable icon in the graphical user interface, the selectable icon enabling the user to go directly to a next display screen associated with a corresponding next process step in the list for providing input associated with the next process step in the list;

displaying a user selectable option in the graphical user interface for the user to select and revert back to a viewing of the list including a sequential listing of the multiple process steps associated with management function; and providing selectable next/back options in the graphical user interface, the selectable next/back options enabling a user to traverse sequential display screens associated with the process steps in the list.

36. The computer system as in claim 25 that additionally performs operations of:

completing execution of a first initial process step in the list via selection of storage area network resources by the user while a second process step itemized in the list is being performed via a background computer process;

providing an indication in the list that the second process step is currently being performed by the background computer process; and during execution of the background computer process for the second process step, enabling the user to save selections associated with other process steps in the list in furtherance of executing the management function at a later time after completion of the background computer process.

37. A computer program product including a computer-readable storage medium having instructions stored thereon for processing data information, such that the instructions, when carried out by a processing device, enable the processing device to perform operations of:

in response to a selection of a management function to configure a storage area network, displaying a list including initial process steps requiring selection of resources in the storage area network to execute the management function;

receiving input from a user for a given process step in the list of initial process steps;

based on the input, dynamically selecting further process steps in addition to the list of initial process steps for display in the list, the further process steps to be performed by the user in addition to the initial process steps to execute the management function; and simultaneously displaying the further process steps in the list to the user along with the initial process steps.

38. A computer system for supporting management information views associated with a storage area network, the computer system including:

means for displaying a list including initial process steps requiring selection of resources in the storage area network to execute the management function in response to a selection of a management function to configure the storage area network;

means for receiving input from the user for a given process step in the list of initial process steps;

means for dynamically selecting, based on the input, further process steps in addition to the list of initial process steps for display in the list, the further process steps to be performed by the user in addition to the initial process steps to execute the management function; and means for simultaneously displaying the further process steps in the list to the user along with the initial process steps.

* * * * *